Figure 15:
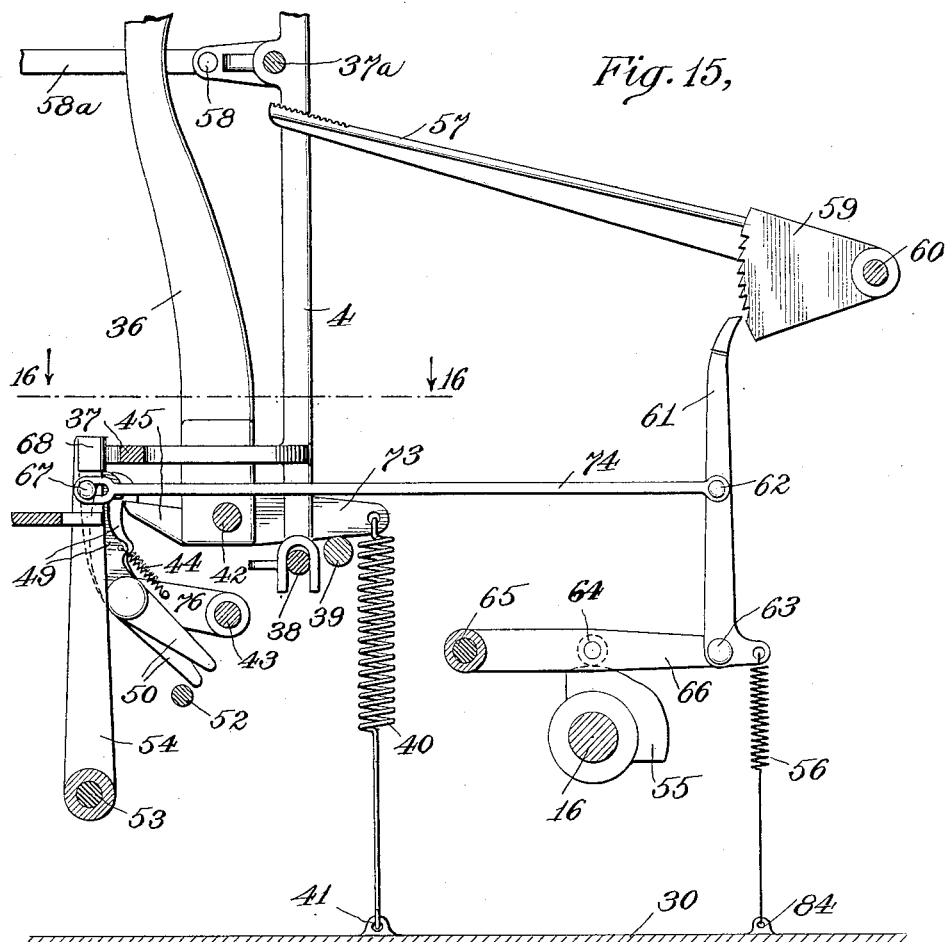

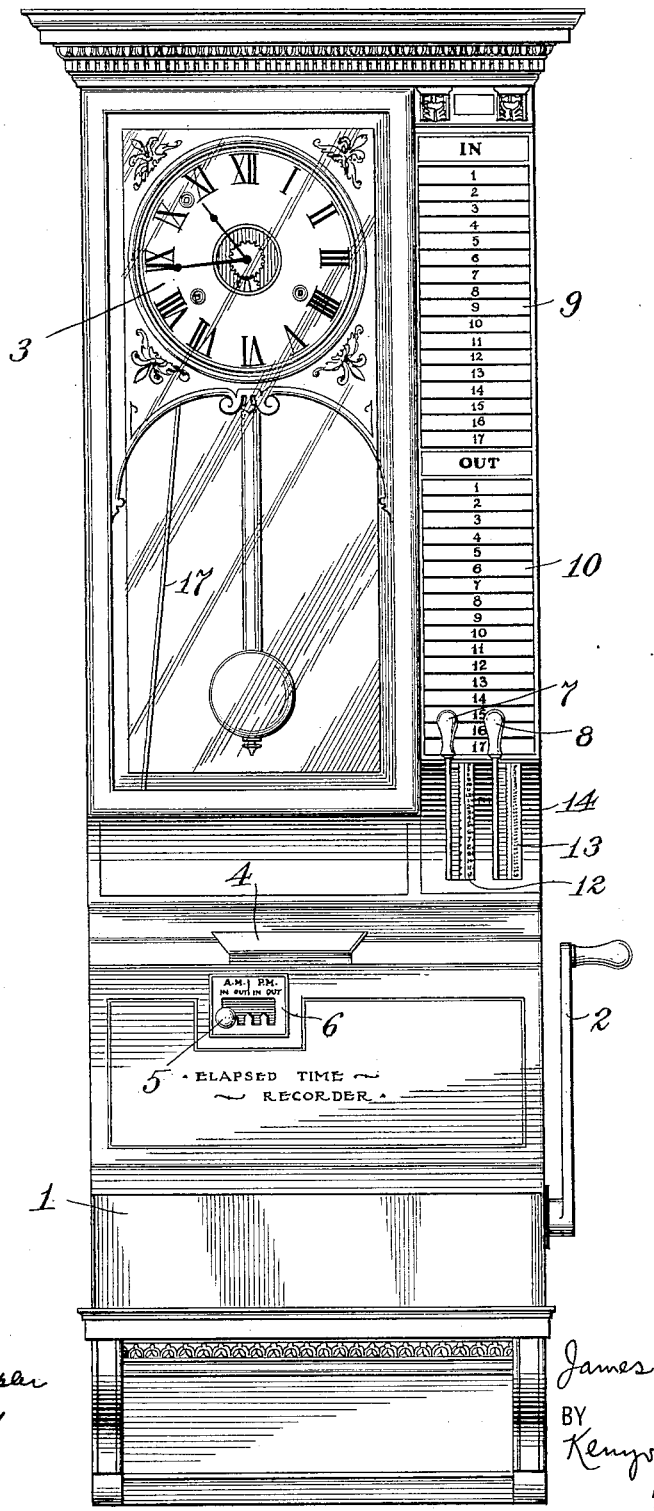

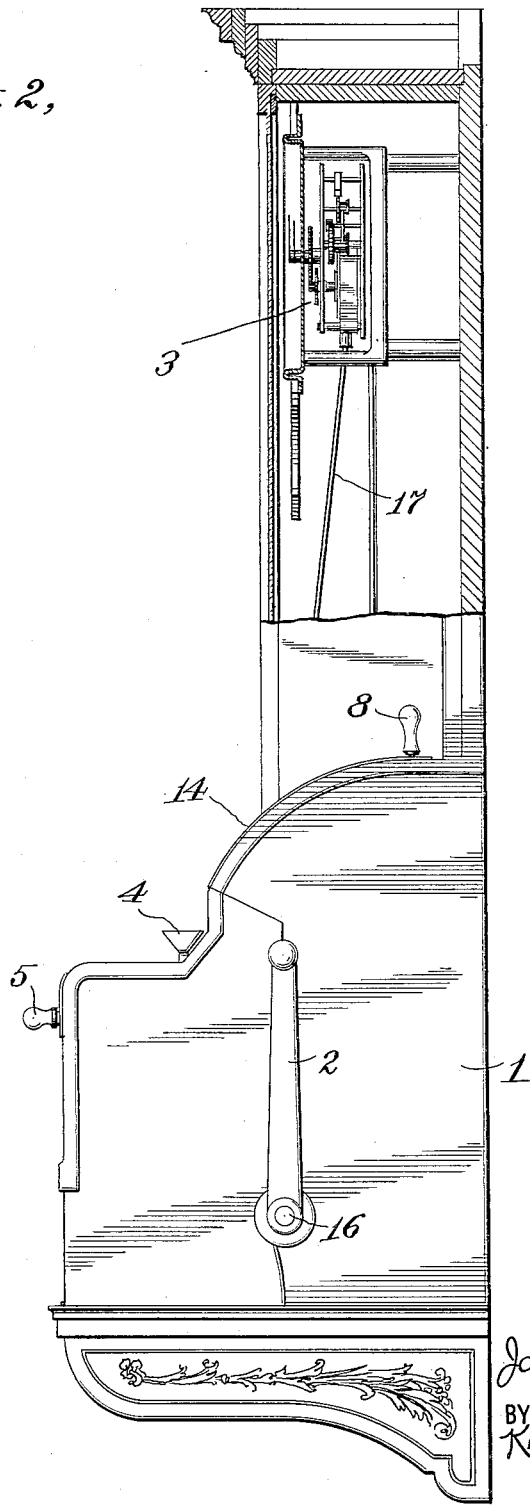

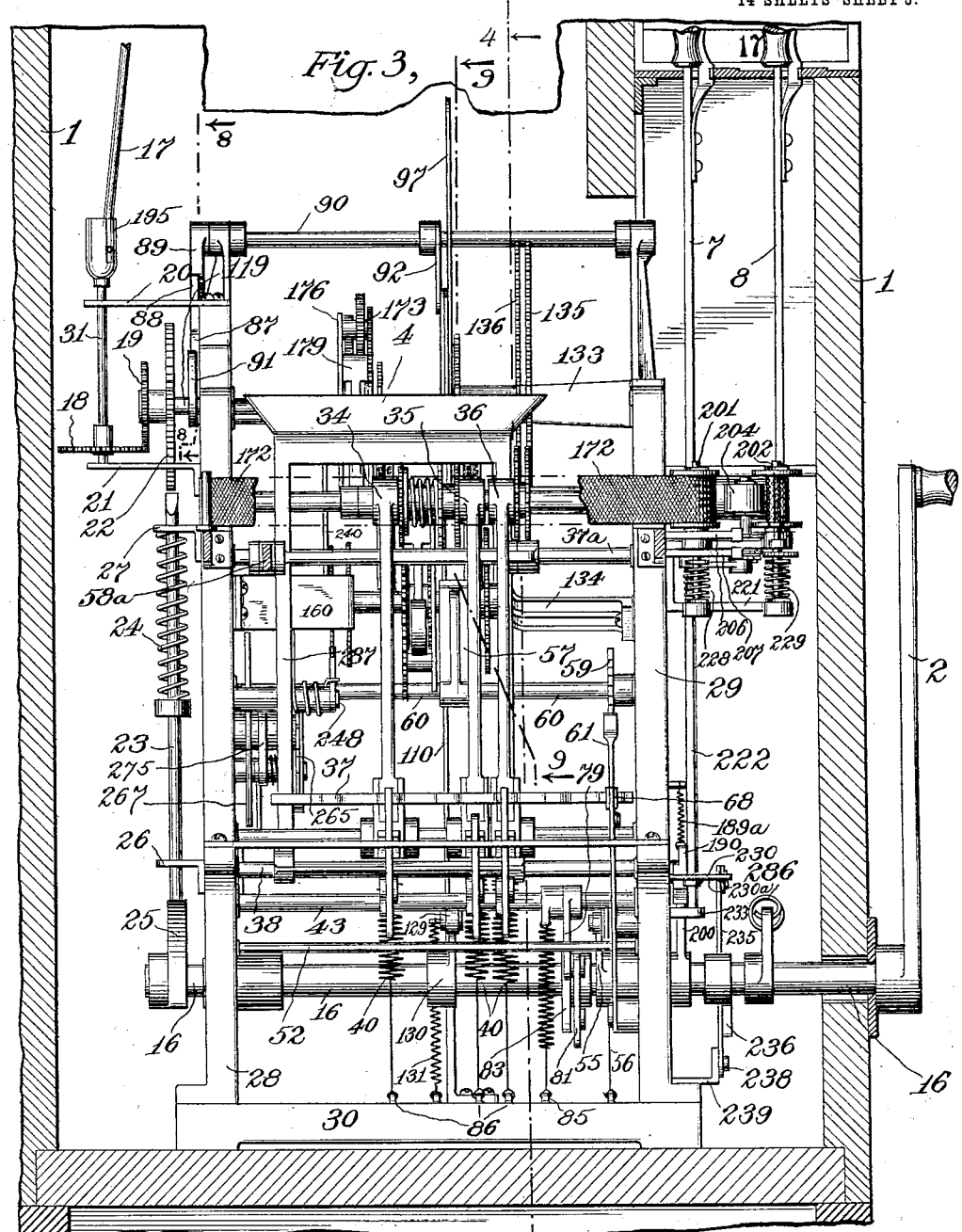

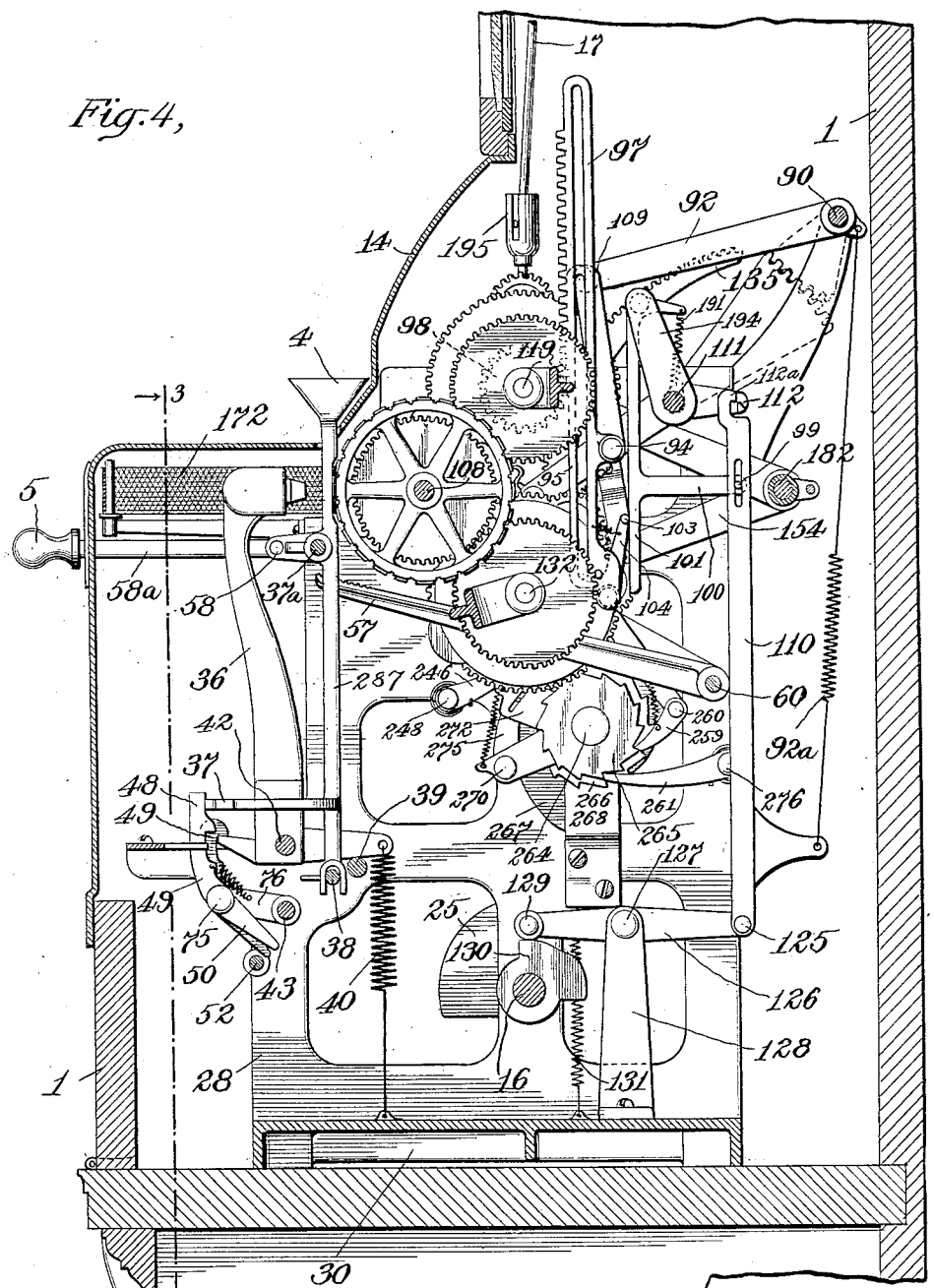

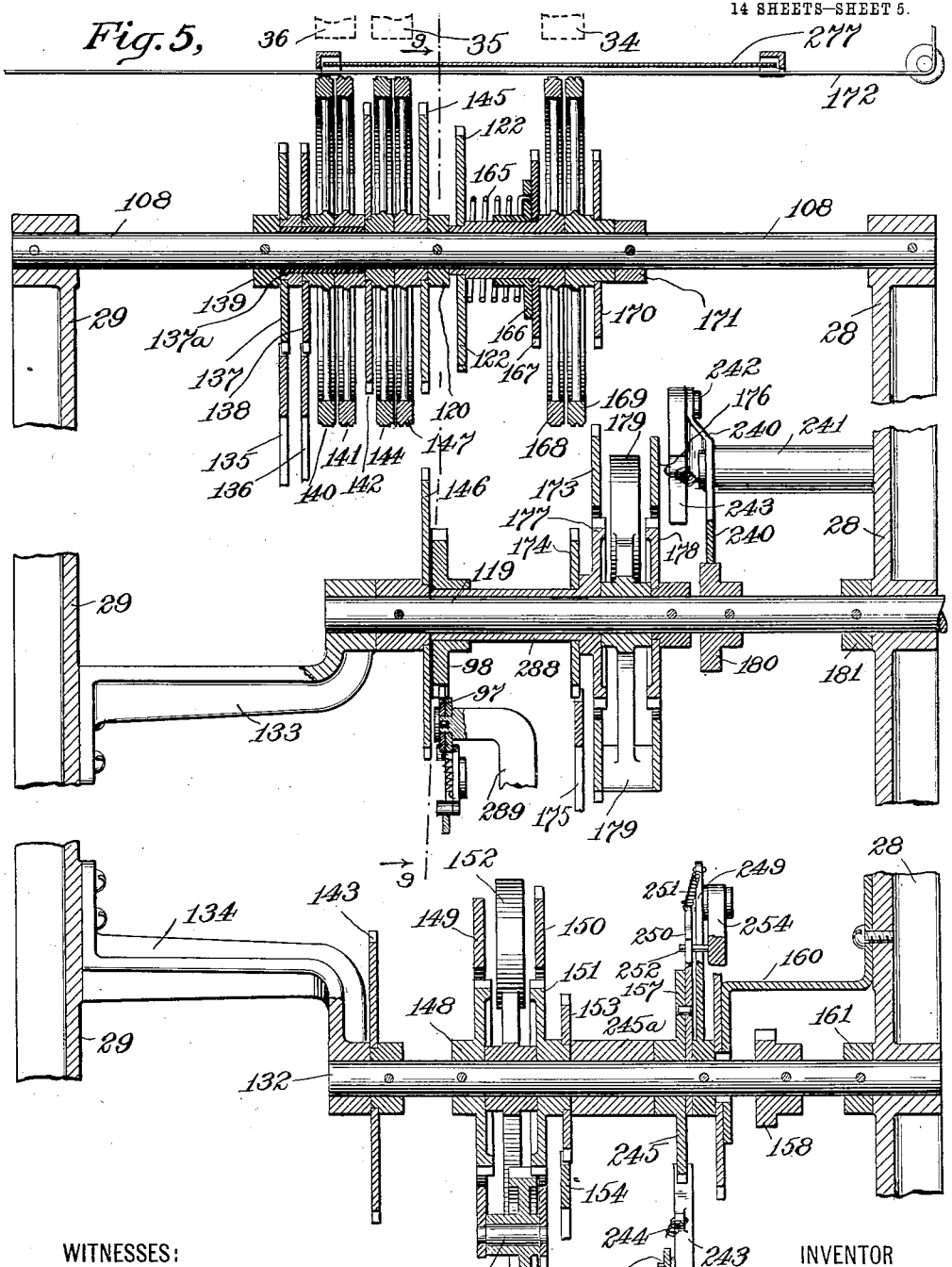

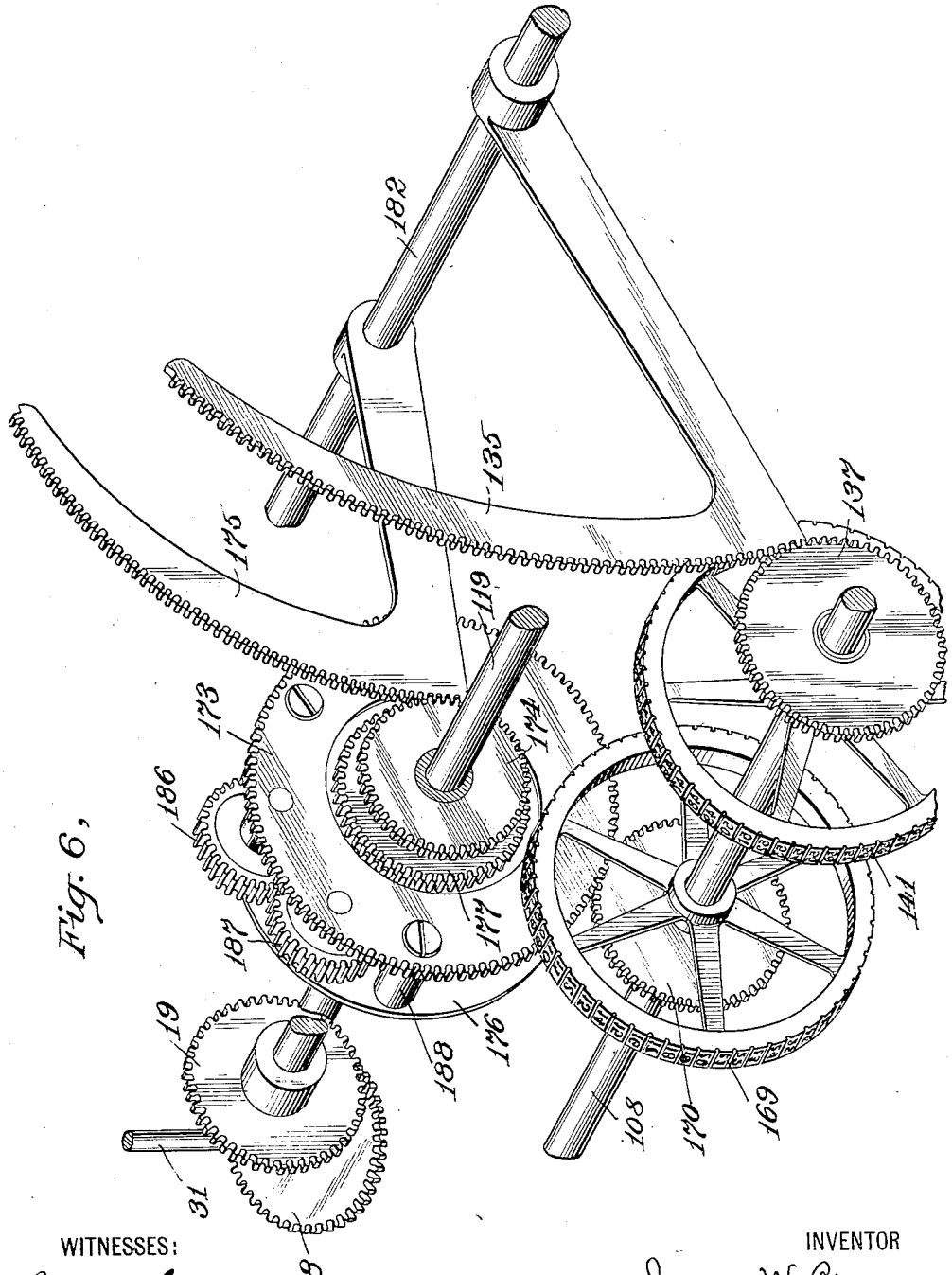

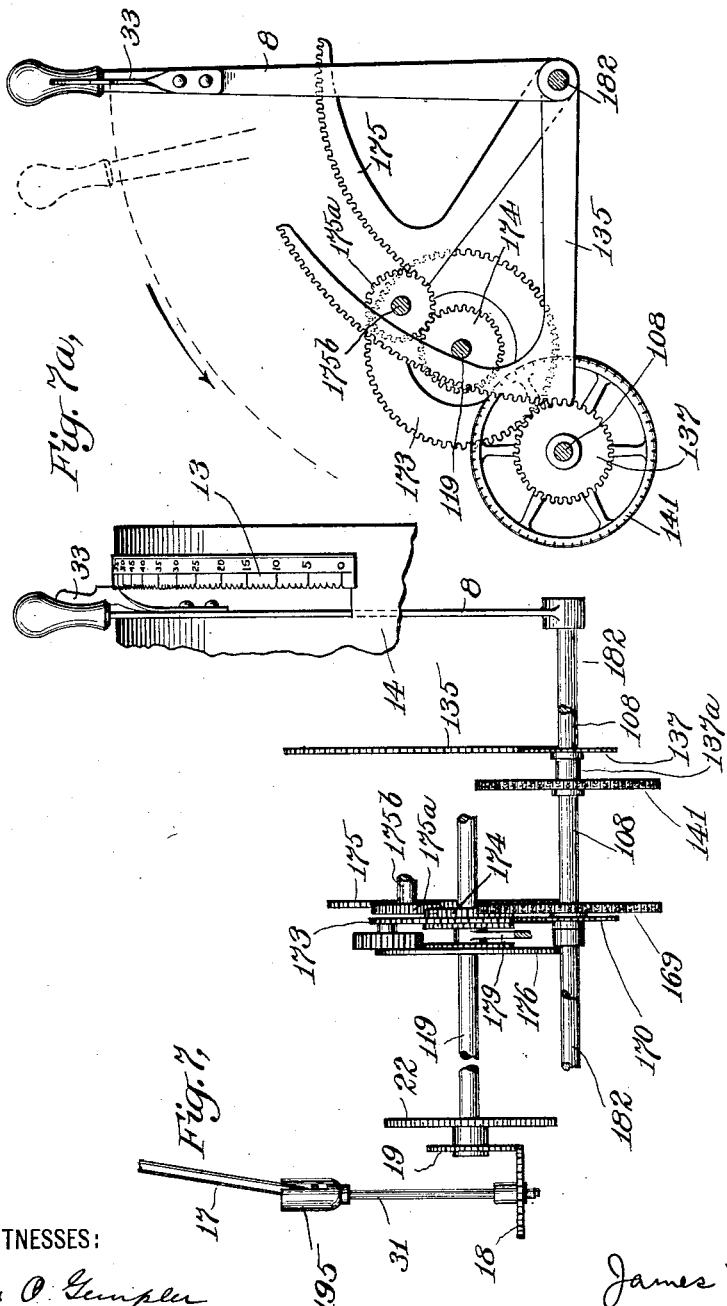

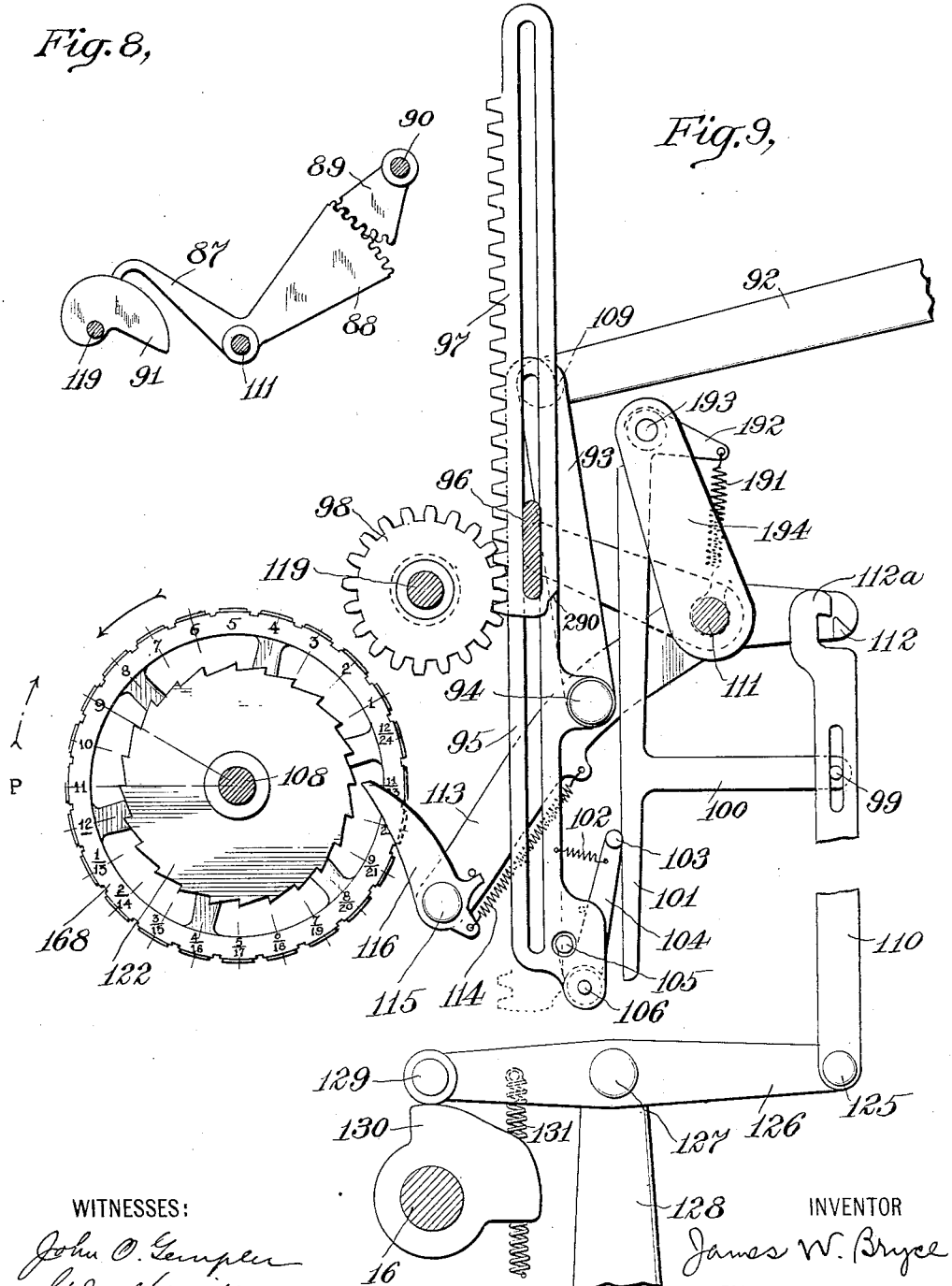

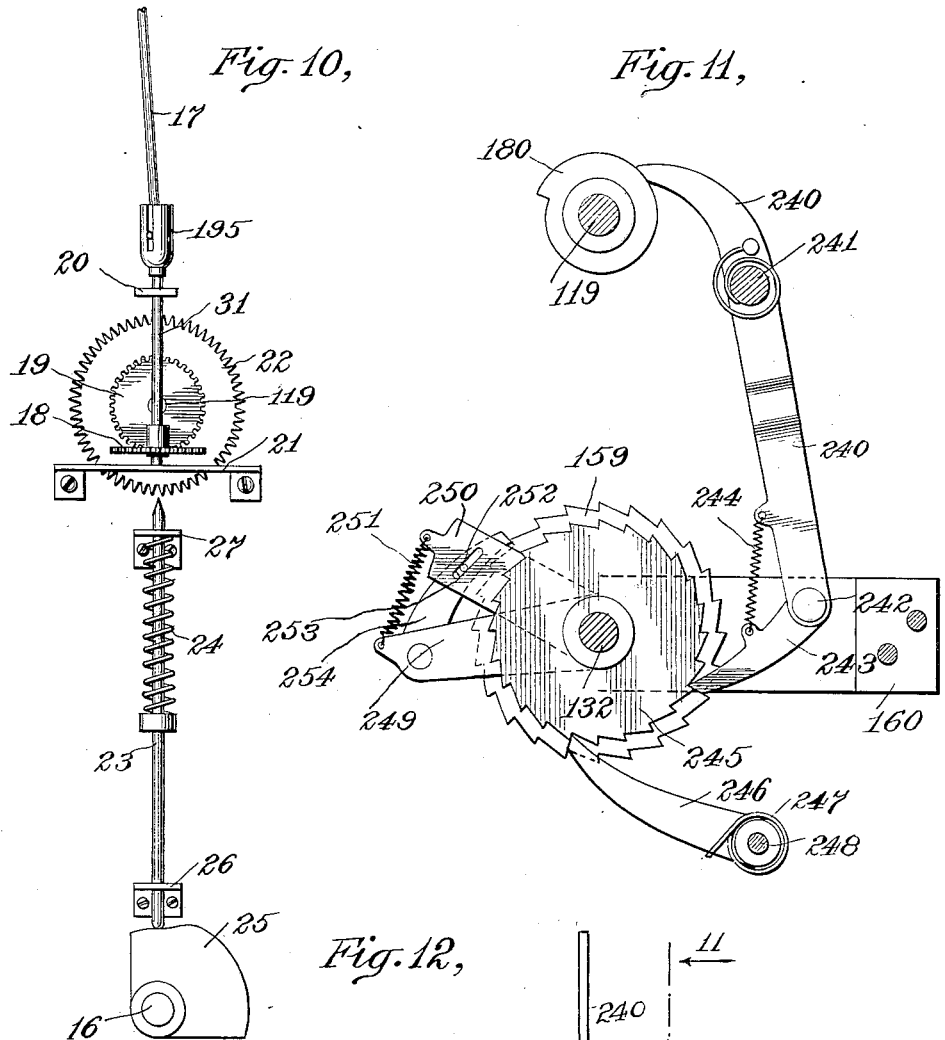

J. W. BRYCE.
TIME RECORDER.
APPLICATION FILED JAN. 17, 1908. RENEWED APR. 11, 1911.
1,075,627.
Patented Oct. 14, 1913.
14 SHEETS—SHEET 10.
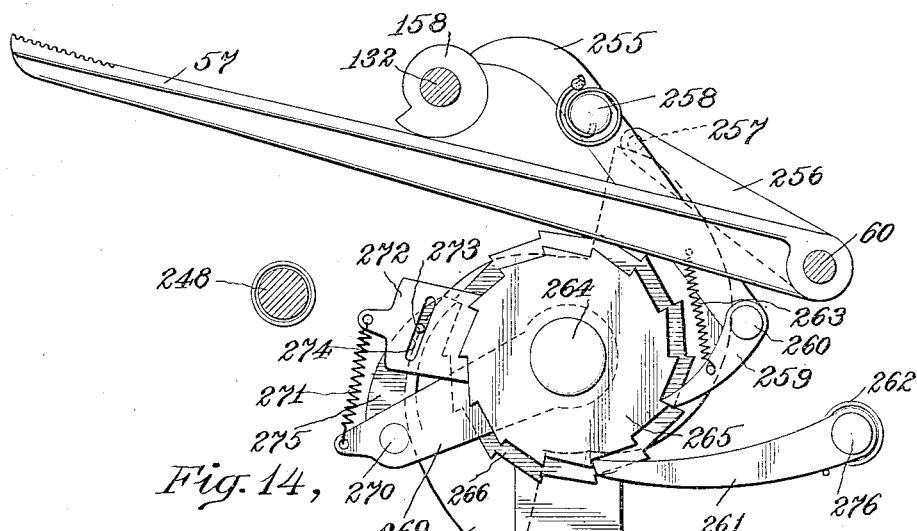
Fig. 13,
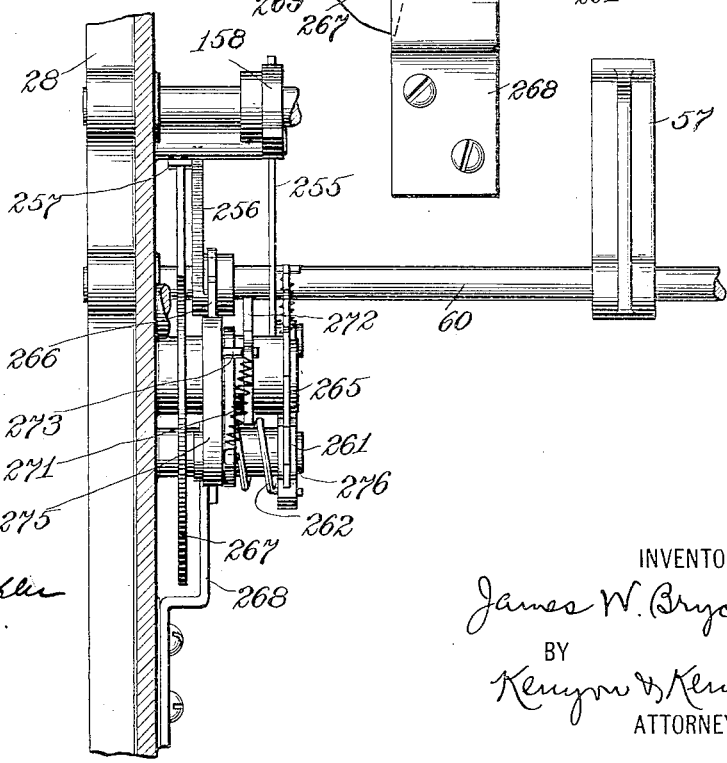
Fig. 14,
WITNESSES:
INVENTOR
James W. Bryce
BY
Kenyon & Kenyon
ATTORNEYS J. W. BRYCE.
TIME RECORDER.
APPLICATION FILED JAN. 17, 1908. RENEWED APR. 11, 1911.

1,075,627.

Patented Oct. 14, 1913.
14 SHEETS—SHEET 11.

WITNESSES:
John O. Gumpher
Geo. M. Harris

INVENTOR
BY James W. Bryce
Kenyon & Kenyon
ATTORNEYS

J. W. BRYCE.
TIME RECORDER.
APPLICATION FILED JAN. 17, 1908. RENEWED APR. 11, 1911.
1,075,627.
Patented Oct. 14, 1913.
14 SHEETS—SHEET 12.
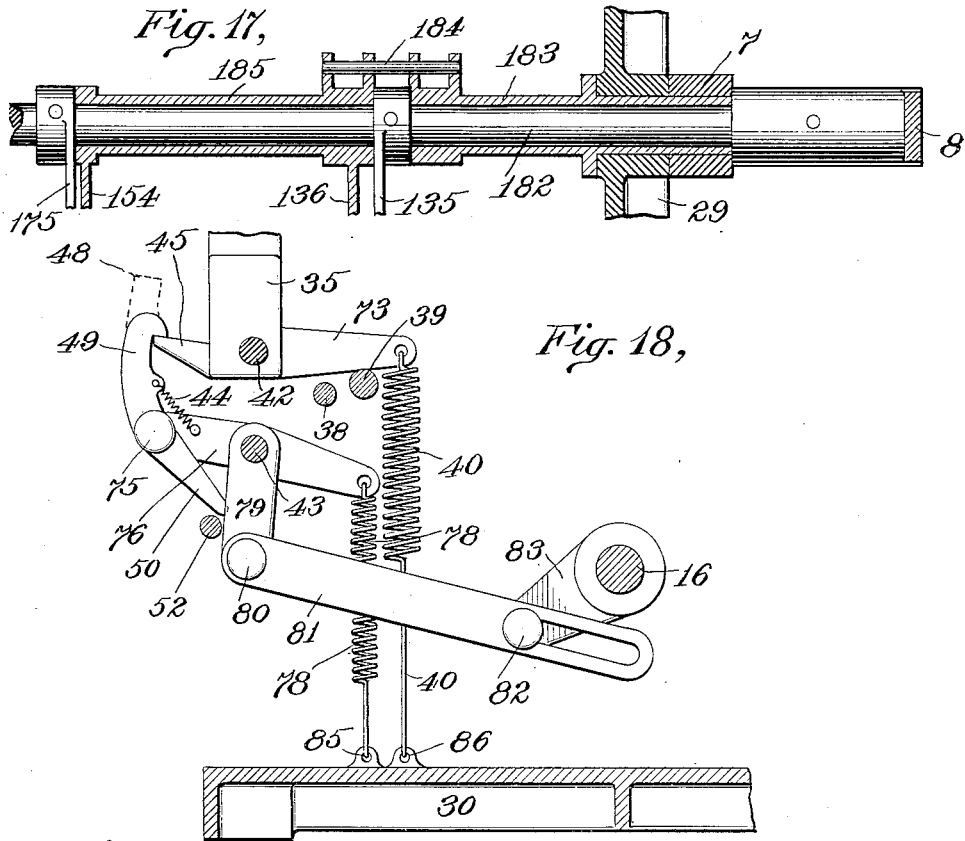
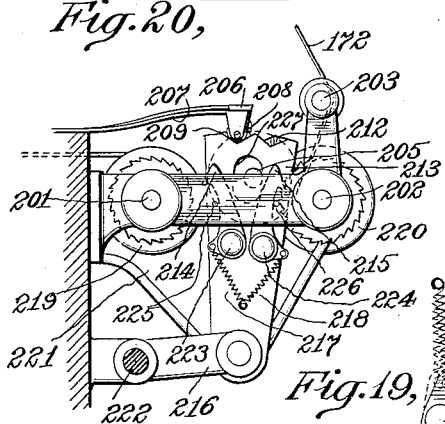
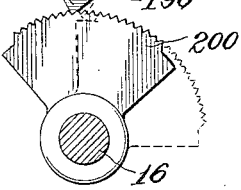
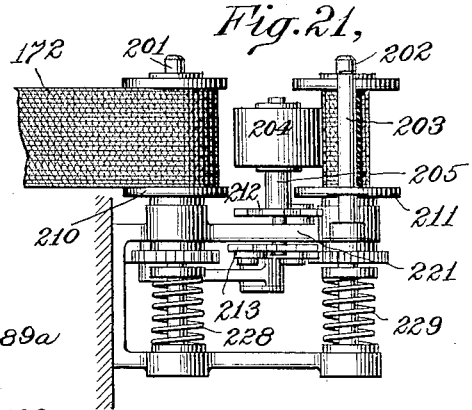
WITNESSES:
John O. Gumper
Geo M Harris
INVENTOR
James W. Bryce
BY
Kenyon & Kenyon
ATTORNEYS
COLUMBIA PLANOGRAPH CO., WASHINGTON, D. C.

J. W. BRYCE.
TIME RECORDER.
APPLICATION FILED JAN. 17, 1908. RENEWED APR. 11, 1911.
1,075,627.
Patented Oct. 14, 1913.
14 SHEETS—SHEET 13.
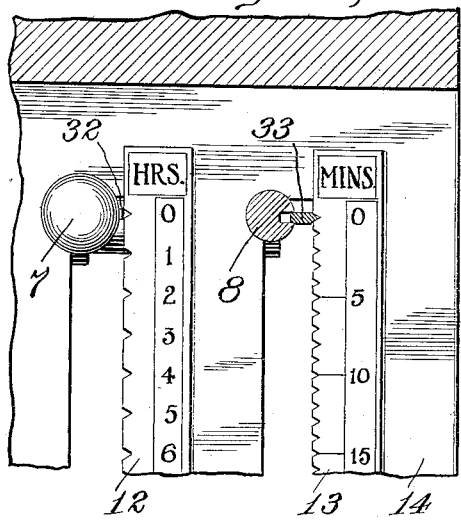
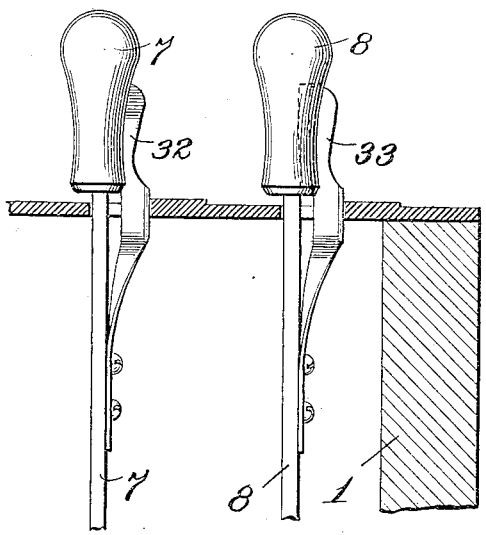
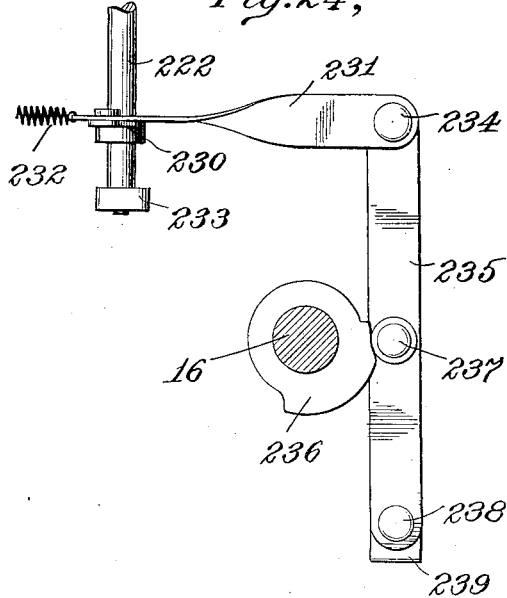
WITNESSES:
John O. Gempler
Geo. M. Harris
INVENTOR
James W. Bryce
BY
Kenyon & Kenyon
ATTORNEYS J. W. BRYCE.
TIME RECORDER.
APPLICATION FILED JAN. 17, 1908. RENEWED APR. 11, 1911.

1,075,627.

Patented Oct. 14, 1913.
14 SHEETS—SHEET 14.

UNITED STATES PATENT OFFICE.

JAMES W. BRYCE, OF BROOKLYN, NEW YORK.

TIME-RECORDER.

1,075,627. Specification of Letters Patent. Patented Oct. 14, 1913.

Application filed January 17, 1908, Serial No. 411,224. Renewed April 11, 1911. Serial No. 620,461.

*To all whom it may concern:*

Be it known that I, JAMES W. BRYCE, a citizen of the United States, and a resident of Brooklyn, in the county of Kings and State of New York, have invented certain new and useful Improvements in Time-Recorders, of which the following is a specification.

My invention relates to time recorders. It is of especial value in connection with elapsed time indicating machines, although in some of its features it is not limited to use in such machines.

It has for its object to provide an elapsed time indicating machine in which the elapsed time indicating mechanism is controlled in its movement one way by the clock movement and is moved the other way by manually operated means and in which preferably the elapsed time indicating mechanism is driven by the clock movement and normally represents the true time; also to provide in such a machine means for verifying the manual operation and preferably means for printing such verification upon a suitable card or other record surface; also to provide means for temporarily shifting the position of the card or other record surface to cause the printing of different parts of a time record upon different parts of the card or other record surface; also to provide means for printing upon a card the time of the " in " or first operation of the machine upon one line and for printing upon another and adjoining line the time of the " out " or second operation of the machine and the elapsed time between the two operations and preferably for also printing again, but this time upon the said second line, the time of the " in " or first operation of the machine for purposes of verification; and also generally to improve and simplify the mechanism of elapsed time indicating machines.

My invention consists in the novel devices herein shown and described.

In the drawings accompanying this specification and forming part hereof, I have shown my invention as embodied in a machine for printing upon a card the elapsed time between two different operations of the machine, although in some of its features at least my invention is not limited to use in such a machine.

I will now proceed to describe the specific embodiment of machine shown in the drawings.

Figure 16:
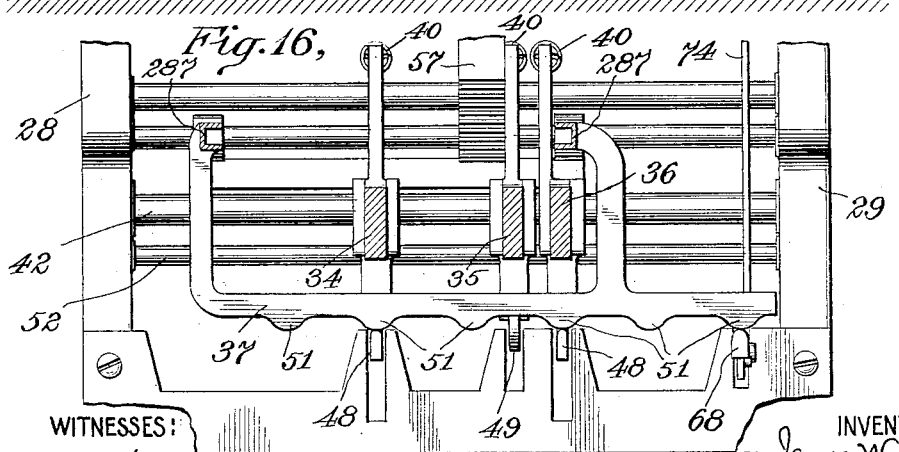

Referring to such embodiment, Figure 1 is a front view of such a machine, including card racks for the card, such as are now in general use with card time recorders. Fig. 2 is a side view of the device with the casing partly broken away, disclosing a side view of the clock movement. Fig. 3 is a front view, on a larger scale, of the interior mechanism of the recorder proper, with the case in section, and is taken on the lines 3—3 of Fig. 4. Fig. 4 is a vertical section taken on the lines 4—4 of Fig. 3. Fig. 5 is a sectional view of the mechanisms on shafts 108, 119 and 132, which shafts carry the various time type wheels and certain parts of their driving connections, the shafts being shown in this view as separated from each other for the sake of clearness, but the various wheels on the different shafts being in the exact alinement they bear to each other in the machine, Fig. 4 showing the true position that the shafts occupy in the machine. Fig. 6 is a perspective view of the minute elapsed time type wheel 169 and the minute verifying wheel 141, together with certain parts of the mechanism used for controlling them. Figs. 7 and 7ª represent a modification of the manually operated handles and their connections. Figs. 8 and 9 are detailed views of the subtractor mechanism, Fig. 9 being a detailed section on the lines 9—9 of Fig. 5. Fig. 10 is a detailed view of the clock drive and the finder wheel for locking the type wheels while a record is being taken. Fig. 11 is a detailed sectional view of the hour transfer mechanism, taken on line 11—11 of Fig. 12. Fig. 12 is a side view of the mechanism shown in Fig. 11. Fig. 13 is a detailed view of the mechanism used for moving the card lift up one point at the end of each day, or the day transfer mechanism as it is commonly called. Fig. 14 is a side view of the same mechanism. Fig. 15 is a detailed view of the means for raising the card lift one-half a point whenever a card is rung out on the machine and also showing the hammer cut-out mechanism. Fig. 16 is a detailed view of the card holder or receiver and its guides and the means for operating the hammer cut-out. Fig. 17 is a detailed view showing the cross-over mechanism connected with the manually operated handles 7 and 8. Fig. 18 is a detail of the printing hammers showing the means for giving a proper printing blow.

Fig. 19 is a detail of the full stroke pawl and plate in side view. Figs. 20 and 21 are details of the ink ribbon mechanism, the former being a face view and the latter a side view. Fig. 22 is a detailed view of the two manually operated time levers, the minute one being shown in section. Fig. 23 is a face view of these two levers, with the case of the machine in section showing the spring actuated pieces for locking the levers in any position. Fig. 24 is a detail of the ink ribbon feed mechanism. Figs. 25, 26 and 27 represent the preferred form of card used with my improved device, Fig. 25 being a face view of the card handed to the workman before the "in" operation, Fig. 26 being the same card after the "in" operation and Fig. 27 the same card after the "out" operation. In the card of Fig. 27 several spaces are shown filled in to show how the card would appear if different jobs had been worked upon by the same workman or the same job commenced and discontinued several times and upon different days.

Before proceeding to describe the mechanism in detail, I will, for the sake of clearness and a better understanding of the operation of the machine, briefly describe the various acts performed by the operator in ringing in and out upon my improved machine and what is accomplished thereby.

1 is the casing of my improved machine shown in the drawings.

9 and 10 are two card racks, 9 being the "in" and 10 the "out" card rack, each being provided with spaces for cards numbered in the usual manner. When the operator desires to ring in, as for example, either in entering the factory at any time or in beginning a job, he takes the card bearing his number out of the "out" card rack. This card may be one of any suitable material, size or shape and provided with any suitable data. In the preferred form of card employed, that shown in Figs. 25-27, the card is provided with parallel vertical columns for "in" and "out" for morning and afternoon and for elapsed time for morning and afternoon and also with parallel horizontal spaces for different days of the week and preferably two parallel horizontal spaces for each day for a purpose presently to be described. In the machine shown, the card lift 57 (Figs. 13 and 15), forming the bottom of the card holder 4, is in the ordinary way automatically raised vertically, by the clock movement, a distance each day equal to that of the distance between the horizontal spaces representing the different days of the week, which distance is, as shown on the card, equal to two of the horizontal spaces. The operator having taken his card from the "out" rack, inserts it into the card holder 4, first, however, having moved the knob 5, which is rigidly connected to the card holder 4, to the proper position to designate either "a. m." in or "p. m." in, whichever the case may be. The knob 5 rests in notches or depressions in plate 6, the plate carrying the proper designations as shown in Fig. 1, corresponding with the different periods. The movement of the arm 5 to the right or left, has the effect of moving the card holder containing the card so as to bring the proper vertical columns opposite the printing hammers. After this has been done, the workman pulls the main operating handle 2 forward and down as far as it will go, permitting it to return to its normal position, which it does through the action of a spring 286. He now withdraws his card and places it in the "in" rack in the proper receptacle. The effect of this first operation has been to print upon the card the time of the operation of the machine in the proper "in" column, either morning or afternoon. Fig. 26 shows the card after such operation, and here the machine was operated at 9.49 a. m. on Sunday, these facts being indicated by the relative location of the figures "9.49" upon the card at 282. At the conclusion of the job or on his departure in the morning or afternoon, the workman withdraws his card from the "in" rack and inserts it in the card holder 4, first seeing that knob 5 is in the proper "out" position, either "a. m." or "p. m." Before placing the card in the card holder, or afterward, if he has taken note of the "in" time as appearing on the card, he moves the hour and minute manually operated levers 7 and 8 in accordance with the hour and minute of the "in" operation of the machine as already printed on the card. He does this by pulling the handle 7 down forward toward him, until an index finger 32 at its side (see Fig. 22) is opposite and enters a groove on the stationary graduated scale 12 at the side representing the hours, opposite the hour "9" in the example herein given, the hour of the first or "in" operation, and by pulling down the minute lever 8 until it is similarly opposite the proper number on the stationary minute graduated scale 13, which in the example given is 49, the index finger 33 entering the notch at that point. The operation of these two levers 7 and 8 has had the effect of bringing upon the printing line type, representing the elapsed time between the two operations, the "in" and the "out" operations of the machine, upon hour and minute elapsed time type wheels 168 and 169 and has also had the effect to bring upon the printing line the type representing the hour and minute "9.49" of the first or "in" operation of the machine upon hour and minute verifying type wheels 140 and 141 (see Fig. 5). The means for effecting these results will be presently described. In this connection, I would merely add that preferably and as shown the elapsed time type wheels 168 and 169 are normally connected with the clock movement 3 and are normally driven by it in one direction so that the elapsed time type wheels at any moment normally represent the true time. The operation of the handles 7 and 8, however, through mechanism which will presently be described, moves these elapsed time type wheels a distance dependent upon the time, 9.49, of the "in" or first operation of the machine, the hour wheel, as shown in my preferred form, being moved back 9 points or hours and the minute wheel 49 points or minutes. This, in effect, subtracts the "in" time from the "out" time and causes the two elapsed time type wheels, upon the second operation of the machine by the workman, to present upon the printing line the hour and minute representing the elapsed time between the two operations, or one hour greater than such time. The operator then pulls operating lever 2 forward, as before. This causes the card lift supporting the card temporarily to move vertically upward a distance equal to one-half of the vertical distance between the different days of the week, bringing upon the printing line the horizontal space forming the lower half of the space opposite "Sun", and also causes to be printed in this space under the proper "in" column the "in" time, as shown 9.49, see 283 Fig. 27, thus giving a verification of the proper manual operation by the workman of the levers 7 and 8, and in the proper "out" column the time of the second or "out" operation of the machine, as shown 11.44 at 284, and also causes one to be subtracted from the hour wheel when necessary and causes to be printed in the proper elapsed time column the elapsed time between the two operations, as shown 1.55 at 285.

It will be observed that all that is required of the workman in the operation of the machine is to see that the knob 5 is in the proper notch at each operation of the machine, to move the handles 7 and 8 in the "out" operation in accordance with the indications upon the card of the "in" time and to move the operating handle 2 at each operation. The rest of the work is done by the machine automatically, elapsed time being computed automatically by it and the various times being printed upon the card in their appropriate places and columns without any mental effort on the part of the operator other than the mere setting and operation of the parts above described. Certain other results are also automatically accomplished by the handle 2, such as the alining and locking of the type wheels, the feeding of the ink ribbon, etc., which will be described in detail later on.

I will now describe the various parts in detail.

*The card holder and connections.*—The card receiver 4 is preferably vertically arranged. It may be of any suitable construction. As shown, it is made of an upper or flaring mouth-piece 4, side pieces 287, three-sided in cross-section, which receive and guide the two sides of the card (see Figs. 3, 5 and 16) and a floor or lift 57 fast on a rocking shaft 60 (see Fig. 15) and adapted to be raised automatically from day to day and also temporarily at each "out" operation of the machine, as will be presently described. Toward the lower part of side pieces 287 there is provided an irregular shaped connecting piece 37, provided with cam surfaces for rendering certain of the printing devices operative or inoperative, as will be presently described. The entire card holder is mounted so as to slide horizontally sidewise on guide rods 37$^a$ and 38, as shown in Fig. 4, the lower ends of side pieces 287 being provided with a U-shaped piece straddling the rod 38. It is moved sidewise by means of a handle 5 connected by rod 58$^a$ to the framework of the card holder. The notches in plate 6 enable the card holder to be moved to exactly the right position and to be held firmly in that position. In Fig. 5 the card holder, with a card 277 in position in it, is shown in cross-section opposite the various type wheels.

*The time type wheels and their operating mechanism.*—These are illustrated in Figs. 3, 4, 5 and 6. The time type wheels which print the time of the "in" and "out" operations, as shown, are the hour type wheel 144 and the minute type wheel 147. These are loosely mounted on the type wheel shaft 108. They are driven by the clock movement 3, which may be of any suitable form and may be located at any suitable point. It is only diagrammatically represented in the drawings. Any suitable connection between the clock movement and the time type wheels 144 and 147 may, of course, be employed. That shown is as follows: 17 is a driving shaft driven by the minute side of the clock movement. At its lower end it has a universal joint 195, of the usual construction, uniting it to a short upright shaft 31 and rotating that shaft. Shaft 31, supported in bearings in strips 20 and 21 secured to the side 28 of the framework, carries at its lower end spur-gear 18, which meshes with spur-gear 19 fast on minute shaft 119 of the recording mechanism, as clearly shown in Fig. 6. Shaft 119 is journaled in the side frame 28, runs across the machine and is journaled in bracket 133 fastened to the opposite side frame 29, as shown in Fig. 5. Shaft 119 is thus driven synchronously with the minute side of the clock movement. 181 is a collar fast on the shaft to keep it in alinement. Mounted slightly in advance of the minute shaft 119, and somewhat lower in the machine (see Fig. 4), is the type wheel shaft 108, upon which the time wheels are mounted. Shaft 108 is stationary, being mounted fast in side frames 28 and 29. Also mounted on this shaft are the elapsed time type wheels 168 and 169 and the hour and minute verifying type wheels 140 and 141; 139 and 171 are collars fast on the shaft and arranged to keep the type wheels in their proper positions on the shaft.

The minute time type wheel 147 is loosely mounted on shaft 108 and fast upon its hub is gear wheel 145. In mesh with this gear wheel is a gear wheel 146 fast on minute shaft 119. By these means, the minute time type wheel 147 is driven by the minute side of the clock movement.

The hour time type wheel 144 is driven by the clock movement by the following described mechanism: Gear wheel 142 is mounted on the hub of type wheel 144, loose on type wheel shaft 108. Gear 142 is driven by gear wheel 143 fast on hour shaft 132. This hour shaft is given an intermittent rotative movement once each hour by means of a cam 180 fast on minute shaft 119. The connections between the cam 180 and shaft 132 are as follows: On a stud 241 projecting from side frame 28 is pivoted a lever 240, one end of which rests on cam 180. At its lower end lever 240 carries pivoted to it at 242 a pawl 243 (see Fig. 11), the latter engaging the teeth of ratchet wheel 245 loose on hour shaft 132, a spring 244 between lever 240 and pawl 243 holding the latter in engagement with ratchet wheel 245. A click pawl 246, pivoted to the framework at 248 and held in engagement with the teeth of ratchet wheel 245 by spring 247 prevents backward rotation of ratchet wheel 245. Fastened securely to ratchet wheel 245 is a plate 250 having a cam groove 253 cut in it. Immediately back of plate 250 is an arm 249 fast on shaft 132. To its outer end is pivoted a pawl 254 adapted to engage the teeth of a stationary ratchet wheel 159 secured to a bracket 160 projecting from the side frame 28. A spring 251 connects the outer ends of plate 250 and arm 249. A pin 252 projects sidewise from pawl 254 into cam slot 253 of plate 250. Slot 253 is cut at an angle so that one end of the slot is nearer the center of shaft 132 than is the other. The operation of these parts is as follows: Cam 180 revolves once each hour with minute shaft 119 and through lever 240 and pawl 243 feeds forward ratchet wheel 245 and plate 250 one point. Arm 249 cannot partake of this gradual movement as pawl 254 is in engagement with one of the teeth of stationary ratchet wheel 159. But as plate 250 gradually moves, the inclined slot 253 gradually forces pin 252 and with it pawl 254 outward from shaft 132 until at the end of the hour the nose of pawl 254 clears the teeth of ratchet 159, whereupon spring 251 causes arm 249, and with it shaft 132, to jump forward one point. As this forward movement takes place, pin 252 and pawl 254 are again forced inward so that the nose of the pawl engages the next tooth of ratchet 159. There is thus a step by step forward movement of shaft 132 and with it is moved the wheel 143 and gear wheel 142 and hour time type wheel 144 at the end of each hour.

Hour shaft 132 is journaled loose in side frame 28 and at the other end in bracket 134 secured to the side frame 29. 161 is a collar serving to keep the shaft in its proper place.

By the above described mechanism the hour and minute time type wheels 144 and 147 are always driven synchronously with the clock, the type in each wheel upon the printing line opposite the card 277 in the card slot and the ink ribbon strip 172 always representing the true time. The means for delivering a hammer blow to cause the printing from these time type wheels and the other type wheels will be described later on.

*The elapsed time type wheels and connections.*—Any suitable elapsed time indicating mechanism may be employed. That shown in the drawings consists of hour and minute type wheels 168 and 169 respectively. These type wheels are loosely mounted on type wheel shaft 108 (see Fig. 5). They are, preferably and as shown in the drawings, driven synchronously by the clock and normally represent the true time, that is to say, the type upon the hour and minute elapsed time type wheels upon the printing line at any time normally representing the correct hour and minute of time. In the form of device shown, these elapsed time type wheels are moved at each "out" operation of the machine a distance dependent upon the time of the "in" operation of the machine by the same operator or on the same job. Preferably this is done by moving them backward or in a direction the reverse of that in which they are driven by the clock movement. This, in effect, subtracts the "in" time from the "out" time, causing the elapsed time type wheels to indicate the elapsed time between the two operations and this time will be represented by the type upon the hour and minute elapsed time type wheels appearing upon the printing line and in the form of machine shown in the drawings this elapsed time will be printed upon the card in the proper column for elapsed time.

The means shown by which the elapsed time type wheels 168 and 169 are normally driven synchronously by the clock are illustrated in Figs. 5 and 6. Any suitable means may, of course, be employed for this purpose. I prefer, however, to use in such connection differential gearing and connections between one side of the differential gear and the clock movement for operating the differential gearing and connections between the differential gearing and the elapsed time indicating mechanism to transmit such motion to the latter to cause it normally to move synchronously with the clock movement. Such preferred form I have shown in the drawings and will now describe. Mounted upon the minute shaft 119 is a differential gearing, of which 179 is the spider loosely mounted on shaft 119 and secured at its outer parts by bolts 188 (Fig. 6) to the ring portions 173 on one side and 176 on the other, between which rings are carried in the usual manner the intermeshing gears 186 and 187 of the differential. With these gears mesh on one side gear wheel 178 fast on shaft 119 and on the other side gear 177 loosely mounted on the shaft. Upon the outer periphery of ring 173 gear teeth are cut, as clearly shown in Fig. 6. These teeth mesh with the teeth of gear 170 secured to the elongated hub of the minute elapsed time type wheel 169. In the normal operation of the parts, the clock movement through shaft 119 and gear 178 operates the differential one way, causing the rings 176 and 173, with their pinions 186 and 187, to rotate at half the speed of the gear 178 in the well known manner. Of course, it will be understood that during this operation gear 177 is held stationary. Gear 170 is shown of half the diameter of that of gear 173, so that the rotary motion of shaft 119 and gear 178 is transmitted through the differential to the gear 170 and minute elapsed time type wheel 169, causing the latter to rotate synchronously with shaft 119 and with the minute side of the clock movement and causing wheel 169 normally to represent the true time in minutes. The hour elapsed time type wheel 168 is normally driven from hour shaft 132, preferably through another differential, in the following manner: As above described, the hour shaft 132 is rotated once each hour. Fast on this shaft is the spur gear 148, which forms one side of the hour differential gearing. 152 is the spider of this differential gearing and its hub is loosely mounted on shaft 132. The spider carries two rings 149 and 150 secured to it by studs the same as those marked 188 in the minute differential described above. On the outer edge of ring 150 gear teeth are cut to mesh with the gear 167 connected with the hour elapsed time type wheel 168 on type wheel shaft 108. Pinions are carried by a pair of studs exactly as described above for the minute differential. One of these pinions appears in section at 55 (Fig. 5) and meshes with spur gear 151 and the other meshes with spur gear 148 on the other side of the differential. Spur gear 151 is connected with hour handle 7, as will be presently described, and normally remains stationary except as operated by said handle. Gear wheel 167 is loosely mounted on the hub of the hour elapsed time type wheel 168 (Fig. 5). It is connected to ratchet wheel 122, mounted on the elongated hub of type wheel 168 by the spring 165, secured at one end to piece 166 and at the other end to ratchet wheel 122. Piece 166 is fast to 167. This connection communicates rotary movement from gear 167 to ratchet wheel 122, and through the spring 165 to the hour elapsed time type wheel 168 so that the latter is advanced one point at the end of each hour, in accordance with the movement of hour shaft 132, but the connections between gear 167 and ratchet 122 and wheel 168 are sufficiently elastic, owing to the spring connection, to permit one to be subtracted from the hour elapsed time type wheel, whenever that is necessary during the computation of the elapsed time during the "out" operation of the machine. The detailed mechanism shown by which this subtraction is accomplished will be presently described.

From the above description it will be seen that the minute and hour elapsed time type wheels are normally driven synchronously with the clock movement and the type upon the printing line of these two type wheels normally represents the true time. In the form of machine shown in the drawings, this result is accomplished through two differential gears, a minute differential and an hour differential.

In order to compute the elapsed time between two different operations of the machine, an "in" operation and a corresponding "out" operation, I have shown means for moving the elapsed time type wheels preferably backward a distance corresponding to the time of the first or "in" operation. The means shown for this purpose are manually operated and are preferably two movable pieces, such as handles 7 and 8 on the front of the machine, adapted to be operated manually. As the elapsed time type wheels, in the machine shown in the drawings, normally stand at the true time, they of course, at the time of the "out" operation of the machine and before they are moved backward, represent the time of the "out" or second operation of the machine. In order to cause them to compute and to indicate the elapsed time, I move them backward a distance corresponding to the time of the first or "in" operation. I do this by providing connections between each of the handles 7 and 8 and its respective elapsed time type wheel and then move each handle a distance corresponding to the hour or minute respectively of the time of the "in" operation. This movement is preferably accomplished by moving the elapsed time type wheels backward, although it may also be accomplished by moving them forward the complement of the backward movement, as will be described later on. This movement is also preferably accomplished through the differential already explained, each handle being connected to a gear at the opposite side of the differential from the side with which the clock-work is connected. The effect of this operation is to move the elapsed time type wheels a distance corresponding to the time of the "in" operation, or in other words, to subtract from the time of the "out" operation the time of the "in" operation, the type wheels indicating and printing such elapsed time. The detailed mechanism shown for this purpose will now be described. It is illustrated especially in Figs. 4, 5, 6, 7, 7ª, 22 and 23. Referring to the devices of Figs. 4, 5, 6, 22 and 23, 8 is the minute manually operated lever. It is mounted fast on shaft 182, the latter having bearings in the side frames of the machine. Alongside of the handle is a graduated stationary scale 13 mounted on a plate 14 in the front of the machine. The graduated scale 13 is provided with notches and numbered to correspond with the minutes, as shown in Fig. 22. On the side of lever 8 I have shown a piece of flat metal 33 adapted to exert a spring pressure against the notches in scale 13 adapted to hold the lever in any set position into which it is moved. A similar spring pressed piece 32 is provided for the hour handle 7 and this is adapted to take into notches in a similar stationary graduated scale 12 representing the hours. Fast on shaft 182 is a sector 175 having teeth adapted to mesh with gear wheel 174 fast on the hub of gear wheel 177 of the minute differential, as clearly shown in Figs. 6 and 5. When handle 8 is pulled downward and forward, through shaft 182 it rocks sector 175 and this turns gears 174 and 177 of the minute differential in an opposite direction to that in which the clock-work drives gear 178 of the differential. As during this movement gear 178 is held by the clock movement, gear wheel 173 will be rotated backward or in the reverse direction in which it is normally driven by the clock movement and through gear 170 will turn the minute elapsed time type wheel 169 backward. The distance which that type wheel will be moved backward will depend upon the extent of movement of the handle 8. As the workman in this operation will move handle 8 a distance corresponding to the minute of the time of the first or "in" operation, as shown on his card, the minute elapsed time type wheel 169 will be moved back a distance representing the minute of that time. 288 is a sleeve secured to shaft 119 to hold gears 174 and 177 and the other parts in their proper places on the shaft. Handle 8 will be held in the position, to which it is moved, by spring 33 and the notches on graduated scale 13. The movement of the minute handle 8 also moves the minute verifying type wheel 141, as will be presently described. The hour handle 7 is similarly connected with one side of the hour differential to move back the hour elapsed time type wheel 168 in accordance with the hour of the "in" time. The specific connections between the handle and the differential shown are as follows: Handle 7 is mounted upon a sleeve 183 loose on shaft 182, see Fig. 17. 185 is a sleeve also loosely mounted on shaft 182, but rigidly connected to sleeve 183 by cross-over rod 184. The purpose of having two sleeves 183 and 185 with a cross-over connection is to permit of the use of sector 135 fast on rod 182, for a purpose presently to be described, and also to permit the sectors on shafts 182, 154, 136 to be arranged in their proper positions in the machine and yet to have the handles 7 and 8 placed alongside of each other on the front casing of the machine. Sleeve 185 carries rigidly secured to it sector 154. The latter is provided with teeth, just like sector 175, which engage with gear 153 fast on the hub of gear 151 of the hour differential. The movement of handle 7 causes sector 154 to move in accordance with its movement and to move gear 151 on one side of the hour differential the opposite way from which gear 148 is normally driven by the clock. As previously described for the minute differential, this operation moves back the hour elapsed time type wheel 168 the distance represented by the movement of the handle 7, and as this movement is made by the workman to correspond with the hour of the "in" operation, it will subtract the hour of the "in" operation from the hour of the "out" operation, leaving the difference or the elapsed time in hours represented by the type on wheel 168 standing upon the printing line.

In the form of my improvement heretofore described, the manually operated handles 7 and 8 move their respective elapsed time type wheels a distance corresponding to the hour or minute of the time of the "in" operation by moving the type wheels backward. In Figs. 7 and 7ª, I show a modification in which this is accomplished by the manually operated handles moving the type wheels forward the complement of such distance. Of course, this is the full equivalent of the backward movement described above. In order to cause sector 175 to move gear 174 so as to cause gear wheel 173 to move in the same direction when operated by manually operated handle 8 as when driven by the clock movement, I insert an idler gear wheel 175ª between sector 175 and gear 174. As the manually operated handle must now move gear wheel 173 and its elapsed time type wheel, a distance representing the complement from zero to the "in" time, the graduated scale is, of course, reversed from that already described and shown in Fig. 22, or in other words, the numbers representing the hours and minutes will run in the reverse direction. In moving each of these handles to the hour and minute respectively representing the "in" time, they will move the distance representing the difference between 12 in hours and 60 in minutes and that time. For example, in the operation indicated under "Sun." in Figs. 26 and 27, the minute elapsed time type wheel, at the commencement of the "out" operation, stood with the minute 44 opposite the printing point or line and the minute of the "in" time was 49. In moving the minute elapsed time type wheel a distance corresponding to or dependent upon the time of the "in" operation, the manually operated minute lever 8 is moved from its normal point opposite 60, on scale 13, to point 49 on the scale, or in other words, is moved eleven points. This will move the minute elapsed time type wheel 169 forward, or in the same direction in which it is driven by the clock, eleven points. As it stood with type 44 on the printing line this would move it so that type 55 would come upon the printing line. This is the exact equivalent of the movement earlier described in the case where manually operated lever 8 moved the time type wheel 169 backward or in the direction the reverse of that in which it is driven normally by the clock, 49 points, or the movement given to it by the manually operated lever 8 in moving from its normal position zero on scale 13 of Fig. 22 to point 49. 49 subtracted from 44 in minutes would, of course, give 55. In Figs. 7 and 8, I have simply illustrated this modification as applied to the minute lever 8 and the minute elapsed time type wheel 169. A similar arrangement, of course, would be provided for the hour lever 7 and the hour elapsed time type wheel 168.

The means for subtracting one from the hour wheel in the elapsed time operation of the machine are as follows, being specially illustrated in Figs. 4, 5, 8 and 9: Whenever the minute of the "in" operation of a machine is larger than the minute of the time of the "out" operation of the machine, it becomes necessary to subtract one from the hour elapsed time type wheel 168. I accomplish this by means of a pawl 116, adapted at the proper times to be operated by the driving mechanism of the machine and to engage with the teeth of ratchet wheel 122 fast on the sleeve of hour elapsed time type wheel 168 to feed it one point backward. As this backward feeding of one point is required only when the minute of the "in" operation is greater than the minute of the "out" operation, I arrange it so that pawl 116 will be operative to do such feeding only during such times. Any suitable means may be employed for this purpose. The ones specifically shown are as follows: Pawl 116 is operated, whenever it is operative, from a cam 130 on main driving shaft 16, through roller 129 mounted at one end of lever 126, the latter fulcrumed at 127 in a bracket 128, secured to the framework. A spring 131 normally holds roller 129 in engagement with the cam. Pivoted at the other end 125, of lever 126, is a link 110, having at its upper end a hook 112ª, adapted at times to take over or engage with a pin 112 at one end of lever 113, loose on shaft 111. Lever 113 carries pivoted at its other end 115 the pawl 116, a spring 114 tending to hold it in position to engage with the teeth of ratchet wheel 122, whenever the pawl 116 is actuated. Pawl 116 is actuated whenever hook 112ª is moved to the right, so as to be in line and to engage with pin 112, as will be presently described. At all other times pawl 116 remains idle.

98 is a pinion fast on sleeve 288 on shaft 119. At its other end, sleeve 288 carries fast on it gear wheel 174, with which engages sector 175 connected with minute manually operated lever 8. Meshing with pinion 98 is a rack 97. This rack is moved vertically downward or upward by the rotation of pinion 98. As shown, when handle 8 is at its zero position, as illustrated in Fig. 22, the rack 97 will be in its upward position, that shown in Fig. 9. A forward movement of lever 8 will cause rack 97 to descend in proportion to the extent of the movement of the lever. Rack 97 is provided with a slot, through which projects the stationary guide piece 96, mounted on a bracket 289, shown in Fig. 5. Mounted alongside of rack 97 is a sliding piece 95, which is also provided with a slot through which stationary guide piece 96 projects. The sliding piece 95 is adapted to slide vertically on the guide piece alongside of rack 97. This sliding piece 95 is controlled, in its vertical movement, by minute shaft 119. It is moved vertically downward by the rotation of that shaft and at the end of a revolution jumps quickly upward to its highest vertical position and is then moved downward again as the shaft rotates. In other words, it is fed downward slowly during each hour and at the end of the hour is suddenly moved upward to its vertical position. It represents, in other words, the minute of the hour of the clock movement, while the rack 97 represents, in its relative vertical position, the minute as represented by the position of the minute manually operated handle 8. Sliding piece 95 is operated from shaft 119 by cam 91 fast on that shaft, toothed sector 88 loose on shaft 111 and having a wiper 87 bearing on the face of the cam, toothed sector 89 meshing with sector 88 and fast on shaft 90, lever 92 also fast on shaft 90, link 93, pivoted at 109 to lever 92 and pivoted to sliding piece 95 at 94. Shaft 90 is free to move in bearings in the side frames 28 and 29 of the machine, see Fig. 3. A spring 92$^a$ secured to the tail end of lever 92 tends to keep wiper 87 in engagement with cam 91 and to raise the sliding piece 95 and its connections when cam 91 permits. Mounted at the lower end of sliding piece 95 is bell crank 104, pivoted to it at 106. At the end of its two arms, the bell crank carries two rollers, 103 and 105. Spring 102 tends to hold the bell crank in the position shown in Fig. 9. One of the levers, 105, is directly in the path of rack 97. The parts are so proportioned that if both the rack 97 and the sliding piece 95 stand, or represent the same minute, roller 105 will just be in contact with the cam corner 290 of the rack 97. If rack 97 now moves downward, or sliding piece 95 upward, the cam corner 290 will force roller 105 slightly to the right, as viewed in Fig. 9. This will force roller 103 to move to the right slightly against a lever 101, which is pivoted at 193 on the stationary piece 194, fast on shaft 111. Lever 101 is provided with an arm 192, to which is secured tension spring 191, tending to keep lever 101 against roller 103 and to return the parts to their original position. An extension 100 of lever 101 carries at its end a pin 99, which fits nicely into a slot in link 110. When bell crank 104 is rocked to the right, as described above, roller 103 will force lever 101 and extension 100 to the right and through pin 99 will rock link 110 to the right until hook 112$^a$ is above pin 112 of lever 113. This position of the parts will be assumed whenever roller 105 is above the cam corner 290 of rack 97, or in other words, whenever the minute represented by the position of the manually operated handle 8 is greater than the minute represented by the sliding piece 95, that is, the minute of the true time. When the parts are in this position, the operation of handle 2 of the machine will cause hook 112$^a$, through pin 112, to rock lever 113, whereupon the pawl 116, through ratchet 122, will move the hour elapsed time type wheel 168 one point backward or will subtract one from the hours. Whenever the hook 112$^a$, however, is to the left, as viewed in Fig. 9, which position it will occupy whenever the number represented by the position of rack 97 and manually operated handle 8 is not greater than the minute of the true time, pawl 116 will not be operated at all and no subtraction will take place.

By means of the improved subtracting devices above set forth, the subtracting will only take place when it is proper to subtract one. This will be true whether the operator, after an "out" operation, forgets to return the handles 7 or 8 to their original position or not. Should the operator omit to return these handles and the next workman to operate them on an "out" operation should simply move them to the proper position to indicate his "in" time, the subtraction will, nevertheless, take place when it is proper for it to take place and at no other time. In other words, the subtracting device will always work correctly, no matter in what position the operator leaves the handles 7 and 8 at the end of an "out" operation. It obviates the necessity of moving the handles 7 and 8 to zero every time the machine is used on an "out" operation. Of course any suitable means could be used, if desired, to automatically release handles 7 and 8 and return them to their original positions at the close of the "out" operation.

*Verifying time wheels and connections.*— For the purpose of verifying the accuracy of the operation by the workman of the manually operated levers 7 and 8, I preferably provide verifying time type wheels and cause to be printed on the card a second time the time of the "in" operation of the machine, and I preferably cause this second printing of the "in" time to be upon a different line upon the card from that of the first printing of the "in" time. Thus, in Fig. 27, the printing of the "in" time at the time of the first or "in" operation of the machine is shown at 282 as "9.49" on the upper one of the two horizontal lines opposite "Sun". I also show immediately below at 283 the second printing of the "in" time "9.49" in the lower of the horizontal lines opposite "Sun". The first or upper "in" time was printed by the hour and minute time type wheels 144 and 147; the second or verified "in" time "9.49", the lower one of the two was printed by the hour and minute verifying time type wheels 140 and 141. These verifying time wheels are loosely mounted on type wheel shaft 108.

The particular mechanism shown in the accompanying drawings for operating the verifying time type wheels are particularly illustrated in Figs. 1, 5, 6, 17, 22 and 23. The verifying time type wheels 140 and 141 are provided on their periphery with type corresponding on wheel 140 to the hours of the day and on 141 to the minutes of an hour. In the form of machine shown, these verifying type wheels normally stand with zero on the printing line and they are moved during the second or "out" operation of the machine to the proper position to bring the type representing the "in" or first operation upon the printing line through the movement of the manually operated levers 7 and 8, already described. Thus these levers not only move the elapsed time type wheels backward a distance representing the time of the "in" operation, but they also move the verifying time type wheels a distance representing the "in" time, in the form of machine shown moving the hour verifying type wheel 140 to a point where the type representing the hour of the "in" time will be upon the printing line, and moving the minute verifying time type wheel 141 to a point where the type representing the minute of the "in" operation will be upon the printing line. The movement of the manually operated handles 7 and 8 is communicated to the verifying type wheels by means of sectors 135 and 136 respectively, 135 controlling the minute wheel 141 and 136 the hour wheel 140. Sector 135 is fast upon shaft 182, which is moved by lever 8, as already described. Sector 135 is provided with teeth on its periphery and these mesh with gear wheel 137 fast on sleeve 137ª. This sleeve is loose on shaft 108 and carries at its other end wheel 141. Sector 136 is fast to sleeve 185 and is moved by manually operated lever 7 through sleeve 183 and crossover 184, as already described. Sector 136 is similarly provided wtih teeth, which mesh with gear wheel 138 fast on the hub of hour wheel 140. 139 is a collar fast on shaft 108 and holds the various type wheels and gear wheels in their proper positions on the shaft. As the workman moves levers 7 and 8 to bring them opposite respectively the hour and minute of the "in" operation of the machine, the hour and minute verifying type wheels 140 and 141 are similarly moved so as to bring the hour and minute of the time of the "in" operation upon the printing line.

It will thus be seen that my improved machine, as disclosed in the drawings, not only contains time type wheels 144 and 147, which are driven by a clock movement, and always represent the correct time and cause that time to be printed upon the card or other suitable record surface, but also contains verifying time type wheels 140 and 141, which at a second or later operation of the machine cause the machine to print upon such record surface a second time, the time of a first or earlier operation of the machine. This effectually guards against any improper operation of the machine by a workman.

In the modification of Figs. 7 and 7ª the type numerals on wheels 141 and 140 will, of course, run in the opposite direction to that of the type wheels illustrated in the other figures.

*The printing hammers and connections.*— These are particularly illustrated in Figs. 3, 4, 5, 15, 16 and 18. As shown in the drawings, three hammers are provided, 34, 35 and 36, one for the elapsed time type wheels, another for the time type wheels and the third for the verifying time type wheels. The relative position of these hammers and their corresponding wheels and the ink ribbon 172 is diagrammatically shown in Fig. 5. Preferably, I so arrange it that the hammer 35 for the time type wheels is operative at every operation, whether for ringing in or ringing out, as the true time of operation is printed at both of these operations, but the hammers 34 and 36 for the elapsed time type wheels and the verifying time type wheels are only operative at the second or ringing "out" operation. Any suitable means, of course, may be employed for rendering them inoperative at the first or "in" operation. The devices shown for this purpose will be presently described. Each hammer is loose on a shaft 42 and has fast to it a piece having a projection 45 at one end and a tail-piece 73 at the other, to which is secured a spring 40, the latter giving the hammer blow after the hammer has been moved backward. Each hammer is moved backward against the strain of spring 40 by the following means: On main shaft 16, see Fig. 18, is fastened lever 83, having at its outer end a stud 82 working in a slot in the end of link 81. The other end of this link is pivoted to the arm 79, at 80. Arm 79 is fast to shaft 43, which carries fast to it levers 76, one for each printing hammer. Each lever 76 carries pivoted at one end, at 75, a tripping pawl, 49, the tail end of each pawl piece being numbered 50 in the drawings. The upper or hooked end of pawl 49 is adapted to take over nose 45 secured to the hammer, a spring 44 secured at one end to pawl 49 and at the other end to lever 76, tending to hold the two in engagement. A spring 78 is provided to return shaft 43 and connections to its normal position. As main shaft 16 rocks, stud 82 will travel along in the slot, and upon reaching the farther end will pull link 81 to the right, as viewed in Fig. 18, rocking shaft 43 and tilting levers 76 in the reverse direction to the movement of the hands of a clock. All those pawls 49 that are free to operate will rock noses 45 of the respective printing hammer in the same direction. As the above described movement of levers 76 and pawls 49 continues, the tail 50 of each pawl thus moved will engage with a stationary rod 52, which runs across the machine, and as the movement proceeds, this contact will cause pawl 49 to rock on its pivot 75, until, at the proper moment, pawl 49 will suddenly slide off from the end of nose 45, whereupon each of springs 40 will cause its hammer to deliver a hammer blow. A spring 40 is provided for each hammer. A stationary rod 39, running across this part of the machine from side frame 28 to 29, acts as a stop for the printing hammers in their forward or printing movement. The printing hammers are, of course, provided with the usual spring action to deliver the proper spring blow.

Inasmuch as the time type wheels 144 and 147 print the "in" time in the "in" operation, as at 278 or 279 or 282 in Fig. 27, and the "out" time in the "out" operation, as at 284 or 291 or 292 in Fig. 27, it is evident that in the particular machine shown in the drawings the hammer 35 for these time type wheels should always be operative. But as the verifying type wheels 140, 141 and the elapsed time type wheels 168 and 169 print only on the second or "out" operation, it is evident that their hammers 36 and 34 respectively should not be operative on the "in" operation of the machine. Any suitable means for accomplishing this purpose may be employed. That preferred by me, and shown in the drawings, is as follows: The card receiver 4 has secured to it a cam frame 37, the form of which is shown in plan in Fig. 16. This frame 37 is provided with a series of bulging or cam portions 51. Two of these, the left-hand two of these cams 51, as shown in Fig. 16, are provided to render inoperative the hammer 34 of the elapsed time type wheels and the middle two of the cams 51 for rendering inoperative the hammer 36 of the verifying time type wheels. The two right-hand cams 51, shown in Fig. 16, are for rendering inoperative or operative, at the proper time, the means for moving the card lift a one-half point upward on the second or "out" operation of the machine, as will be presently described. Each of the hammers 34 and 36 are rendered inoperative through their tripping pawls 49, 49. For this purpose, the pawls 49 of the hammers 34 and 36, instead of being shaped as shown in full lines in Fig. 18, which represents the pawl of hammer 35, have a slight upward extension 48 at their upper end, shown in dotted lines in Fig. 18 and in full lines in Fig. 4. The upward extension 48 lies in the same horizontal plane as the cam surfaces 51 of frame 37. When the card receiver and frame 37 are in their a. m. "in" or p. m. "in" positions, one or the other of the cams 51, shown at the left in Fig. 16, lies opposite the extension 48 of pawl 49 of hammer 36. This holds pawl 49 outward, or to the left, as shown in Fig. 18, so that its hook is free of nose 45. Accordingly, when handle 2 is operated, and link 81 is pulled to the right, moving the connecting parts, pawl 49 is merely pulled down and does no work, and hammer 36 is not operated. In the same position of the card receiver and frame 37, the extension 48 of the pawl 49 of hammer 34 is similarly held outward, and that hammer is not operated. But when the card receiver is moved to the a. m. "out" or p. m. "out" position, none of the cam surfaces 51 engage with either of the extensions 48, and in this position of the parts the pawls 49 of hammers 36 and 34 operate those hammers in the manner already described. The card receiver 4 and the cam frame 37 are guided accurately in their horizontal movement by rods 37$^a$ and 38, upon which the card receiver moves, and by which it is accurately guided. The cam surfaces 51 are thus always, at the proper times, brought accurately into alinement with the extensions 48 of the pawls 49 and also with the extension 68 of the lever 54 for rendering operative or inoperative the lifting of the card lift 57 a one-half point on the "out" operation.

The ink ribbon mechanism may be of any suitable construction. That shown, is illustrated especially in Figs. 3, 4, 5, 20, 21 and 24, and will now be described. The ink ribbon 172 passes directly in front of the various type wheels and between them and the various hammers, as illustrated diagrammatically in Fig. 5, and as shown in Figs. 3 and 4. A cam 236 is fastened to main shaft 16, see Figs. 3 and 24, and has bearing on it roller 237, mounted on lever 235, pivoted at its lower end 238 to piece 239, fastened to the side frame 29. To the upper end of lever 235 is pivoted, at 234, a link 231. This link is fastened to the lever 230, mounted securely on shaft 222, which has a bearing 233 at its lower end. A tension spring 232 is provided to keep the roller 237 against cam 236. At the upper end of vertical shaft 222 (see Fig. 20), is mounted lever arm 216. This arm carries at its other end a pivot, on which is mounted a vibrating plate 213. This plate has, at its upper end, a pair of V-shaped notches, in which rests roller 209. To plate 213 is pivoted, at 223 and 224 respectively, the two pawls 214 and 215. Two tension springs 217 and 218 tend to keep these pawls against the ratchet wheels 219 and 220, unless the pawls are positively held from engagement with the ratchet wheels, as subsequently described. Two stop pins 225 and 226 keep the pawls from falling out of position. On the opposite side of the supporting casting 221 is pivoted the notched arm or plate 212, in one of the notches of which rests a roller 208. Springs 206 and 207 respectively hold rollers 208 and 209 in operative position. Upon plate 212 is mounted a stud 205, which projects on one side of the plate and supports the roller 204 and on the other side goes through the slot 227 in plate 213. Roller 204 rests against either one or the other of the ink ribbon spools 201 and 202. As the ink ribbon spool against which it rests grows larger, roller 204 is gradually moved and when it has been moved far enough, plate 212 suddenly shifts, due to the roller 208, finally reaching the top of the piece between the two notches near its edge. As the plate flies over to its new position, pin 205 strikes the edge of slot 227 and causes plate 213 to suddenly fly over also. Plate 213 carries with it, of course, the two feeding pawls 214 and 215, throwing the one out of engagement with its ratchet and throwing the other into engagement with the opposite ratchet, causing the feed of the ribbon to be automatically reversed. Ratchet 219 is fastened to shaft 201, to which bobbin 210 is fastened. A compression spring 228 is mounted in the usual fashion to keep the proper tension on the ribbon. In the same way, the ratchet 220 is mounted on shaft 202, on which bobbin 211 is mounted, and compression spring 229 is provided to keep the necessary tension. A guide stud 203 is provided to keep the ribbon 172 in place. The supporting casting 221 is mounted on the side frame 29 of the machine.

*Card lift and connections.*—In the machine shown in the drawings, my improvement is shown in connection with a so-called Rochester machine, in which a weekly time card is used, the card lift or support for the card being automatically fed upward each day so as each day to bring a different space representing a different day of the week upon the printing line. My improvement is, however, not limited to use in such a machine. Any suitable means may be employed for such automatic daily feed where one is used. The devices shown are especially illustrated in Figs. 5, 12, 13 and 14. On hour shaft 132 is secured cam 158. This cam moves forward one point at the end of each hour, as already explained. Bearing upon cam 158 is a lever 255, pivoted at 258, and carrying at its opposite end a pawl 259 pivoted to it at 260. Spring 263 connected to the pawl and the lever tends to hold pawl 259 in connection with ratchet 265 loose on stud shaft 264. Click pawl 261, mounted on pivot 276 and pressed by spring 262, prevents backward rotation of ratchet 265. Lever 255 gradually feeds forward ratchet 265, and with it arm 272 fast with ratchet 265. This gradually stretches tension spring 271, connecting the end of arm 272 with the end of arm 269 fast with large cam 267. Shaft 264 is a short shaft supported in side frame 28. A pawl pivoted at 270 to the end of arm 269 carries a pin 273, extending sidewise from it into slot 274 in arm 272. Slot 274 is arranged so as to run at such an angle that as arm 272 moves away from arm 269 the slot will force pin 273, and with it pawl 275 outward, until the nose of the pawl is freed from the teeth of stationary ratchet 266. Immediately thereupon, spring 271 will move arm 269 until slot 274 and pin 273 again force pawl 275 inward, causing it to engage the next tooth of the stationary ratchet 266. 267 is a large cam fast with arm 269. Thus at the end of each day cam 267 is rotated one point. Bearing on the cam surface of this cam is a roller 257 projecting sidewise from lever arm 256, fastened to shaft 60. Also fast on this shaft is the card lift 57, which forms the movable bottom of the card receiver and upon which the card rests. As cam 267 is rotated step by step, day by day, the card lift 57 is intermittently lifted a prescribed distance each day, bringing the different horizontal spaces upon a card inserted in the card receiver opposite the printing line. The distance of this daily upward feed is equal to the height of the space allotted to each day of the week, as shown in Figs. 25 to 27. Each of these spaces is divided into two horizontal spaces, so that the daily feed upward comprises two such spaces.

Preferably in the printing in the second or "out" operation of the machine of the "in" time also, for purposes of verification, I print the verified "in" time upon a different line from that upon which the "in" time was printed at the "in" operation of the machine. As shown on the cards used in the machine of the drawings, each daily space is divided into two horizontal portions and in the upper one of these the "in" time is printed and in the lower one under the "in" time is printed the verifications of such "in" time, as clearly appears at 283 or 278 or 279 in Fig. 27. In order to effect the printing of the "in" time on one horizontal space and of the verified "in" time at the later operation of the machine on another, I provide means for automatically giving the card lift a vertical movement equal to one-half of its daily automatic movement. This is done, of course, only on the second or "out" operation. Any suitable means may be employed for this purpose. The devices which I prefer are especially illustrated in Fig. 15. On a shaft 53 is mounted a lever 54, having a cam shaped nose 68 on its upper end resting against one of the cam surfaces 51 of cam frame 37, whenever the card receiver is in an "in" position. A pin 67 is riveted to the side of lever 54 near its upper end and projects into a slotted link 74, pivoted at 62, on pawl piece 61. Pawl piece 61 is pivoted at 63 to the outer end of arm 66, pivoted on rod 65 and having a roller 64 resting on a cam 55 fast on main shaft 16. A tension spring 56, secured to the framework at 84, and to the end of pawl 61, tends to keep pawl 61 in engagement with the teeth of sector 59, fast on shaft 60 of card lift 57. Spring 56 also tends to keep roller 64 in engagement with cam 55. Unless pawl piece 61 is positively held away from engagement with the teeth of sector 59, pawl piece 61 will feed sector 59 one tooth upward at each operation of shaft 16, and this will, of course, lift the card lift 57 a corresponding distance. The parts are so proportioned that this vertical movement will be equal to one of the horizontal spaces on the card, or in other words, one-half of the vertical daily automatic feed, referred to above. As this vertical feed of one of the horizontal spaces is desired only at the "out" operation of the machine in order to bring the lower horizontal space opposite the day upon the printing line, as for example, spaces 283, 284 and 285 on the card shown in Fig. 27, and such vertical feed is not desired at the "in" operation, I arrange it so that pawl 61 will be positively held out of engagement with the teeth of sector 59 on an "in" operation of the machine. This is done by one of the two right-hand bulging cam surfaces 51 of frame 37, as viewed in Fig. 16, being in engagement with the upward extension 68 of lever 54. This forces lever 54 to the left, as viewed in Fig. 15, causing pin 67 to pull link 74 to the left and remove pawl 61 to the left so that when raised by cam 55, it will not engage with the sector. At the "out" operation, however, neither cam surface 51 engages with projection 68 and pawl 61 is accordingly moved to the right into engagement with sector 59 by means of spring 56. A sufficient number of teeth are provided on sector 59 so that, no matter what the position of the card lift 57 during the week, pawl 61 will always find one tooth with which to engage. By means of my improved devices, the "in" time is printed upon one line and the verifying "in" time, "out" time and elapsed time are printed upon another line of the card. A check is thus placed upon the operator and a ready verification of the accuracy of his movement of the manually operated lever is given by a mere inspection of the card. The elapsed time is computed by the machine and is printed upon the card. The said vertical movement is only a temporary one, the card lift sinking to its original position at the close of the operation.

In order to aline and lock the time type wheels, I provide for that purpose a finder wheel 22 (see Figs. 3 and 10), fast on minute shaft 119. 23 is the finder rod carried in brackets 26 and 27, carried on the side frame 28 and guided by them. On main shaft 16 is a cam 25, which at the proper time serves to force the finder rod 23 upward into contact with the finder wheel 22. This operation occurs at the very first part of the operation of the main operating handle of the machine. A compression spring 24, working between bracket 27 and a collar on rod 23, serves to keep the point of the finder rod 23 out of contact with finder wheel 22, whenever the cam 25 will permit it, and serves to keep the lower end of finder rod 23 in contact with the cam. These parts have the usual construction and aline and lock the time type wheels in the ordinary manner.

Fig. 19 represents a device of the usual character employed to secure a full stroke of operating handle 2 and its connecting parts. Pawl 190 is a full stroke pawl pivoted on stud 189, secured to side frame 29, pointed at its lower end and adapted to engage a toothed sector 200, mounted on the main shaft 16. The dotted lines in Fig. 19 represent the sector at the beginning of a stroke and the full lines when the stroke is about half completed. It prevents backward movement of the parts until the full stroke has been made. A spring 189$^a$ restores pawl 190 to its normal vertical position after the passage of the teeth of sector 200 in either direction.

The term "card", as used by me in this application, is used broadly to represent any suitable article or surface adapted to receive the indications by the machine and it may be made of any suitable material and of any suitable shape. Preferably, I use a paper card containing a week's record, although of course my invention is not limited to any such kind of card. In Fig. 27, the card is shown as containing records of a number of operations, although, of course, if desired, a separate card may be used for the computation and indication of each separate elapsed time.

The indicating mechanism shown in the drawings and specifically described, consists of type wheels adapted to print the various indications made by the machine, but any other suitable indicating means may be employed, if desired.

My improved device, it will be observed, is partly manual and partly automatic. For example, the elapsed time type wheels are moved in one direction and in each computation of elapsed time to one limit, by the clock movement, and in the other direction or to the other limit, by manually operated means. In the form of the invention shown, the automatic movement in one direction, or to one limit, indicates the time of the second or "out" operation of the machine, while the manual operation represents the time of the "in" or first operation, and this form of my invention is the one I prefer to use in practice.

By means of my improved device, an elapsed time indicating machine can be used which is manual in at least a part of its operation, and which yet, by its indications, gives a verification of the accuracy of such manual operation and shows at a glance whether the workman has performed such manual operation properly or not. In the preferred form of my improvement, this verification is a verification of the starting time and is preferably indicated by printing the same upon the card. The "in" time is thus printed twice upon the card and preferably upon different lines, my improvement enabling this to be readily and automatically done. In my improvement, as shown, a separate hammer is provided for each set of type wheels, enabling the printing to be done in a much better manner than if individual hammers were not employed and at the same time permitting such of the hammers as are not needed in any part of the operation to lie idle and preventing the printing of unnecessary matter upon the card which would complicate and confuse the record.

Many modifications in or departures from the specific devices shown in the drawings, besides those specifically mentioned herein, can, of course, be made without departing from my invention.

What I claim as new and desire to secure by Letters Patent, is:—

1. The combination of elapsed time indicating mechanism controlled in its movement one way by a clock movement, and means adapted to be manually operated for moving such indicating mechanism in the other direction to cause the indicating mechanism to indicate the difference in time between two operations.

2. The combination of elapsed time indicating mechanism, a clock movement for moving the same in one direction and means, manually operated, for moving the indicating mechanism in the other direction, whereby the elapsed time indicating mechanism will be caused to indicate the elapsed time between two operations of the machine.

3. The combination of an elapsed time type wheel, a clock movement for moving the type wheel in one direction to cause it normally to represent the true time, means adapted to be manually operated to move the type wheel backward a distance representing an earlier operation of the machine, whereby the elapsed time type wheel will be moved so as to bring upon the printing line type representing the time that has elapsed since such earlier operation.

4. The combination of an elapsed time type wheel, a clock movement for driving it so as to cause it normally to bring upon the printing line type representing the true time, a lever adapted to be manually operated, a graduated scale representing the different divisions of time represented by type on the type wheel and along which the lever is adapted to be moved and connections between the lever and the type wheel adapted to move the latter in accordance with the manual movement of the lever along the scale, whereby the elapsed time between two operations of the machine will be represented by the type brought upon the printing line.

5. The combination of a clock movement, hour and minute elapsed time type wheels driven by the clock movement in one direction and normally representing the true time, a lever for each type wheel adapted to be manually operated, a graduated scale for each lever containing divisions of time represented by the type on the corresponding type wheel and along which scale the said lever is adapted to be moved and connections between each lever and its type wheel, whereby a movement of either lever will move the corresponding elapsed time type wheel backward in accordance with the movement of the lever over the scale, whereby the type wheels after such manual operation of the levers, may have type representing the elapsed time between two operations of the machine brought upon the printing line.

6. The combination of an elapsed time type wheel, a differential for driving the type wheel, a clock movement connected with one side of the differential and through it driving the elapsed time type wheel to cause it normally to indicate the true time, a lever adapted to be manually operated, a graduated scale representing divisions of time and along which the lever moves, and connections between the lever and the other side of the differential for moving the differential and through it the elapsed time type wheel as the lever moves over the scale, whereby the elapsed time type wheel will normally move with the clock and represent the true time, but will be moved manually to represent the elapsed time between two operations of the machine.

7. The combination of an hour and a minute elapsed time type wheel, a differential for driving each wheel, a clock movement connected with one side of each differential for moving the latter and through it its type wheel in one direction, a lever for each type wheel, a graduated scale along which the lever is adapted to move and having divisions of time corresponding to those represented by the type on the corresponding type wheel, and connections between each lever and one of the differentials for moving the differential and through it the corresponding elapsed time type wheel backward as the lever moves along the scale, whereby the elapsed time type wheels will normally move with the clock movement and represent the true time and may be moved backward manually by said levers to represent the elapsed time between two operations of the machine.

8. The combination of elapsed time indicating mechanism controlled in its movement one way by a clock movement, means adapted to be manually operated for moving the indicating mechanism in the other direction, and means for verifying the accuracy of such manual operation controlled by the manually operated means whereby the elapsed time indicating mechanism may be operated manually in one direction and a verification of the accuracy of such movement may be given.

9. The combination of elapsed time indicating mechanism, a clock movement for driving the same in one direction so that the indicating mechanism will normally indicate the true time, means adapted to be manually operated for moving the indicating mechanism in the reverse direction a distance corresponding with the time of an earlier operation of the machine, and means for verifying the accuracy of such manual operation controlled by the manually operated means, whereby the elapsed time indicating mechanism will indicate the elapsed time between two operations of the machine and a verification will be given of the accuracy of the manual part of the operation.

10. The combination of a time type wheel for printing the time of each operation of the machine, a clock movement for driving the same, an elapsed time type wheel, means for causing it to indicate the elapsed time between two operations of the machine, a verifying time type wheel, and means to cause it on a second or later operation of the machine to indicate the time of a first or earlier operation of the machine the said means being controlled by the means for causing the elapsed time type wheel to indicate elapsed time.

11. The combination of a time type wheel for indicating the time of each operation of the machine, an elapsed time type wheel, a clock movement for driving the time type wheel and for driving the elapsed time type wheel in one direction, a verifying time type wheel, and manually operated means for moving the elapsed time type wheel and moving the verifying time type wheel a distance representing the time of the first operation, such movement of the elapsed time type wheel being in the reverse direction to that in which it is driven by the clock, whereby the elapsed time type wheel will be caused to indicate the elapsed time between the later and earlier operations of the machine and the verifying type wheel to indicate the time of the earlier operation.

12. In a time recorder, the combination of time indicating mechanism, manually operated means for controlling the time indicating mechanism as to part of its indicating operation, and a verifying device controlled by the manually operated means for giving an indication of the accuracy of such manual control.

13. The combination of time indicating mechanism, a clock movement for moving the indicating mechanism in one direction, manually operated means for moving it in the other direction to enable it to give its time indication, and a verifying indicating device controlled by the manually operated means for giving an indication of the accuracy of the operation of the said manually operated means.

14. The combination of a time type wheel adapted to be actuated at each operation of the machine to give an indication of the time of such operation, an elapsed time type wheel, a clock movement for moving the time type wheel and the elapsed time type wheel in one direction so as normally to indicate the true time, a verifying time type wheel, manually operated means for moving the verifying time type wheel to cause it to indicate the time of an earlier operation of the machine and for moving the elapsed time type wheel in the reverse direction to that in which it is driven by the clock a distance represented by the time of such earlier operation of the machine, a card for receiving the various indications, means for shifting the card so as to bring different columns of the card opposite the different indicating wheels at the second or later operation of the machine from those opposite such indicating wheels at the first operation, and means, controlled by the said last mentioned means, for moving the card temporarily at right angles to the former movement to bring a different part of the said columns of the card opposite the indicating wheels, whereby the indication made by the time type wheel at the two operations will be upon different columns of the card and the indications of the various indicating wheels at the second or later operation of the machine will be upon a different part of the columns from that containing the indication made upon the card at the first operation.

15. The combination of a time type wheel adapted to be actuated at each operation of the machine to give an indication of the time of such operation, an elapsed time type wheel, a clock movement for moving the time type wheel and the elapsed time type wheel in one direction so as normally to indicate the true time, a verifying time type wheel, manually operated means for moving the verifying time type wheel to cause it to indicate the time of an earlier operation of the machine and for moving the elapsed time type wheel in the reverse direction to that in which it is driven by the clock a distance represented by the time of such earlier operation of the machine, a card for receiving the various indications, means for shifting the card so as to bring different columns of the card opposite the different type wheels at the second or later operation of the machine from those opposite such type wheels at the first operation, and means, controlled by the said last mentioned means, for moving the card temporarily at right angles to the former movement to bring a different part of the said columns of the card opposite the type wheels, printing hammers, one for each wheel, and means for preventing printing from the type upon the elapsed time type wheel and the verifying type wheel at the first or earlier operation, whereby the time of each operation of the machine will be printed by the time type wheel, but upon different columns of the card and whereby the elapsed time between the two operations and the verification of the time of the first operation will be printed only at the second operation of the machine and together with the time of the said second operation will be printed upon the card upon a different portion of the columns from that upon which the time of the "in" operation was printed.

16. In a time recorder, the combination of a card holder, time printing mechanism, manually operated means for causing the time printing mechanism to make a record of the time upon a suitable card in the card holder, and means actuated by the aforesaid means to shift the card holder temporarily so as to bring a different part of the card upon the printing line, and a device for rendering the latter means operative or inoperative, whereby the time records may be made at different times upon different parts of the card.

17. In a time recorder, the combination of a card holder, time printing mechanism, means for shifting the relative position of the card holder and printing mechanism in one direction, means controlled by such relative position for temporarily shifting the position of a card in the card holder in another direction, whereby in one position of the card holder and time printing mechanism relative to each other, the card will be temporarily shifted to bring a different part of the card upon the printing line and when the two are in another position relative to each other the card will not be thus shifted, whereby time records may be made upon a card on different lines.

18. In a time recorder, the combination of a card, time printing mechanism for printing the time on the card, means for shifting the position of the card and the time printing mechanism, for temporarily shifting each other, means, controlled by the said relative position of the card and time printing mechanism, for temporarily shifting the position of the card in another direction relative to the time printing mechanism, whereby when the card and time printing mechanism are in one position along the line of the movement first referred to, the card and time printing mechanism will be shifted in the operation of the machine that effects the printing in another direction relative to each other, and when they are in the other relative position along the first mentioned line of direction the card and time printing mechanism will not be shifted relatively to each other in the other direction.

19. In a time recorder, the combination of a card, time printing mechanism for printing upon the card time indications of the operations of the machine, manually operated means for shifting the horizontal position of the card and time printing mechanism relative to each other, and means, automatically actuated by the operation of the machine which effects the printing, for moving the card and the time printing mechanism vertically relative to each other whenever the card and time printing mechanism occupy one horizontal position relative to each other, but not when they occupy another horizontal position relative to each other, whereby time records may be made upon the card in different vertical columns, as desired and also under certain conditions in different vertical parts of the same column.

20. In a time recorder, the combination of a card, time printing mechanism for printing upon the card time indications of the operation of the machine, manually operated means for shifting in one direction the card and time printing mechanism relative to each other so as to bring different columns of the card opposite the time printing mechanism, means controlled by a clock movement for automatically shifting the position of the card and time printing mechanism at right angles to said direction at predetermined times to bring different parts of the different columns upon the card upon the printing line, means for temporarily shifting the position of the card and the time printing mechanism relative to each other in the direction of such automatic movement adapted to be actuated when the card and time printing mechanism occupy one position in the other direction relative to each other, but not when they occupy another position in the same direction relative to each other, whereby different columns upon the card may be brought opposite the printing mechanism as desired, the position of the card and printing mechanism will be automatically shifted from time to time to bring different parts of the columns of the card opposite the printing mechanism and whereby in a certain relative position of the card and printing mechanism with reference to one another the two will be shifted temporarily relative to each other to bring a different part of a column opposite the printing mechanism temporarily.

21. In a time recorder, the combination of a time type wheel controlled by a clock movement adapted to print the time of each operation of the machine, a verifying time type wheel, means for causing the latter wheel at a later operation of the machine to indicate the time of an earlier operation of the machine, and devices adapted upon said later operation to shift the position of a card temporarily relative to the two type wheels, whereby a record of the time of the earlier operation will be printed upon one line of the card and the time of the said earlier operation and the time of the later operation will be printed upon another line of the card.

22. In a time recorder, the combination of a time type wheel adapted to print upon the card the time of each operation of the machine, a verifying time type wheel, means for causing it at a later operation of the machine to print upon the card the time of the first operation of the machine, devices adapted to temporarily shift the card to bring a different part of the card upon the printing line, and means for rendering such devices operative at a later operation of the machine and inoperative at an earlier operation of the machine, whereby a record of the time of the first operation of the machine will be printed upon one line of the card and upon another line upon the card will be printed the time of said earlier operation and also the time of the later operation.

23. In a time recorder, the combination of means controlled by a clock movement for automatically shifting the position of a card at predetermined times to bring different parts of the card upon the printing line, a time type wheel adapted to print the time of each operation of the machine, a verifying time type wheel, means for causing it at a later operation of the machine to print the time of an earlier operation thereof, devices adapted to shift temporarily the position of the card a fractional part of the distance that the card is automatically shifted at each of such predetermined times, and means for rendering such devices inoperative at a first or earlier operation of the machine and operative at a second or later operation of the machine.

24. The combination of elapsed time indicating mechanism, a clock movement, differential gearing, connections between the clock movement and one side of the differential gearing adapted normally to operate the latter one way, connections between the differential gearing and the elapsed time indicating mechanism to transmit such movement to the latter mechanism to cause the latter normally to move synchronously with the clock movement, and manually operated means connected with the other side of the differential gear to move the indicating mechanism back a distance corresponding with the time of an earlier operation of the machine, whereby the elapsed time indicating mechanism may be caused to indicate the elapsed time between two operations of the machine.

25. The combination of elapsed time indicating mechanism, a clock movement, a differential gearing, connections between the clock movement and one side of the differential gear adapted normally to operate the differential gear one way, connections between the differential gear and the elapsed time indicating mechanism to transmit such movement to the latter to cause it normally to move synchronously with the clock, a sector connected with the other side of the differential gear, and manually operated means for moving the sector so as to cause the elapsed time indicating mechanism to move backward a distance corresponding with the time of an earlier operation of the machine, whereby the elapsed time indicating mechanism may be caused to indicate the elapsed time between two operations of the machine.

26. The combination of elapsed time indicating mechanism, a clock movement, a differential gearing, connections between the clock movement and one side of the differential gear adapted normally to operate the differential gear one way, connections between the differential gear and the elapsed time indicating mechanism to transmit such movement to the latter to cause it normally to move synchronously with the clock, a sector connected with the other side of the differential gear, a lever adapted to be manually operated and connected with the sector, a spring catch mounted on the lever, a graduated scale representing divisions of time corresponding with those on the indicating mechanism and provided with notches along which the lever is adapted to move and into which the catch is adapted to take to lock the lever and its connections in any position to which they are moved, whereby the elapsed time indicating mechanism may be moved to any position to indicate the elapsed time between two operations of the machine and will be locked in such position.

27. The combination of a minute elapsed time type wheel, an hour elapsed time type wheel, a clock movement, a minute differential gear, an hour differential gear, connections between the clock movement and one side of each differential gear adapted normally to move the differential gear one way, connections between the minute differential gear and the minute elapsed time type wheel to transmit such movement to the minute elapsed time type wheel to cause it normally to move synchronously with the minute side of the clock movement, connections between the hour differential gear and the hour elapsed time type wheel to cause the latter normally to move synchronously with the hour side of the clock movement, and manually operated means connected with the other side of each differential gear adapted to move it and its elapsed time type wheel backward a distance corresponding with the minute or hour respectively of an earlier operation of the machine, and means controlled by the backward movement of the minute elapsed time type wheel when it passes the zero point to increase the backward movement of the hour elapsed time type wheel one point, whereby the hour and minute elapsed time type wheel may be caused to indicate the elapsed time in hours and minutes between two operations of the machine.

28. The combination of a plurality of time type wheels, manually operated means for shifting a card and type wheels relatively to each other, a plurality of printing hammers, and means controlled by the manually operated shifting means for rendering operative or inoperative one or more of the printing hammers depending upon the relative location of the card and type wheels.

29. The combination of a time type wheel, manually operated means for shifting a card and type wheel relatively to each other, a printing hammer, and means, controlled by the manually operated shifting means, to make the hammer operative or inoperative, whereby the relative location of the card and the time type wheel will determine whether the type wheel will or will not print upon the card.

30. The combination of a card, a time type wheel, manually operated means for shifting the card relative to the time type wheel, a printing hammer, and a cam controlled by the manually operated shifting means to make the hammer operative or inoperative dependent upon the location of the card.

31. The combination of a plurality of time type wheels, a card holder adapted to be manually moved relative to the type wheels to bring different parts of the card opposite the different type wheels, a plurality of printing hammers, means for operating each hammer, a cam frame secured to the card holder, and adapted to move with it and provided with cams adapted to render operative or inoperative one or more of the printing hammers dependent upon the location of the cam frame.

32. In an elapsed time indicating machine, the combination of an elapsed time type wheel, manually operated means for controlling the movement of said type wheel in one direction in its elapsed time indicating operation, a verifying time type wheel actuated by said manually operated means for verifying the correctness of the operation of such means, a time type wheel adapted to print the time of each operation of the machine, printing devices for each type wheel, manually operated means for shifting the card relative to the type wheels, and devices actuated by the shifting means for rendering inoperative the printing devices of the elapsed time type wheel and the verifying time type wheel upon a first or "in" operation of the machine but permitting them to operate upon a second or "out" operation of the machine.

33. The combination of elapsed time indicating mechanisms, one representing a higher and the other a lower denomination of time, a manually operated means for controlling each of such indicating mechanisms at one limit of its elapsed time indicating operations, and means for subtracting a unit from the indicating mechanism of the higher denomination controlled by the relative position of the manually operated means of the lower order or denomination with respect to the position of the elapsed time indicating mechanism of the lower denomination at the time of the operation of such manually operated means, whereby when the position of the manually operated means of the lower order represents a higher unit of the lower order of time than is represented by the position of the elapsed time indicating mechanism of the lower order, a unit will be subtracted from the elapsed time indicating mechanism of the higher order.

34. The combination of elapsed time indicating mechanisms, one representing a higher and another a lower denomination of time, a clock movement for controlling such indicating mechanisms at one limit of their elapsed time indicating operations, a separate manually operated means for each indicating mechanism for controlling it in its movement at the other limit of its elapsed time indicating operation, means for subtracting a unit from the indicating mechanism of the higher order, and two devices, one controlled by the clock movement and the other by the manually operated means of the lower denomination whose position relative to each other controls the operation of the subtracting device, whereby the subtracting means will be operative to subtract one from the indicating mechanism of the higher order only when the position of the device controlled by the manually operated means of the lower order represents a higher unit of that lower order than is represented by the position of the device controlled by the clock movement.

35. The combination of elapsed time type wheels, one of a higher and the other of a lower denomination, a clock movement for controlling the elapsed time type wheels at one limit of their elapsed time operation, a separate manually operated means for each type wheel, a movable part actuated by the clock movement and by its position representing the time of the lower denomination, a movable part actuated by the manually operated means of the lower denomination and adapted by its position to represent the unit of the lower denomination represented by the operation of such manually operated means, and means for subtracting a unit from the type wheel of higher denomination controlled by the relative positions of the two movable parts, whereby a unit will be subtracted from such wheel only when the movable part actuated by the manually operated means represents a higher unit of the lower denomination than is represented by the position of the other movable part actuated by the clock movement.

36. The combination of an hour elapsed time type wheel, a minute elapsed time type wheel, a clock movement connected with and driving the said time type wheels, a handle, adapted to be manually operated, for each type wheel, connections between each handle and its corresponding type wheel to move the latter in accordance with the movement of the handle to represent the hour or minute of an "in" or first operation of the machine, a movable part connected with and moved by the minute handle, a movable part connected with and moved by the minute side of the clock movement, means for subtracting one from the hour elapsed time type wheel, contacting surfaces on the two movable parts adapted to coöperate with each other when the minute represented by the position of the minute handle is higher than the minute of the clock movement to cause the subtracting means to subtract one from the hour elapsed time type wheel.

37. The combination of an hour elapsed time type wheel, a minute elapsed time type wheel, a clock movement for driving them in one direction so that they will normally represent the true time, an hour handle and a minute handle each adapted to be manually operated, connections between each handle and its corresponding type wheel to move it a distance dependent upon the time of an "in" or first operation of the machine to cause the type wheels to indicate the elapsed time between two operations of the machine, a movable part connected with and moved by the minute handle, a movable part driven by the clock movement and normally representing the true minute of time, a cam on one part adapted to engage the other part when the minute represented by the position of the minute handle is higher than the minute represented by the position of the minute elapsed time type wheel, a device for subtracting one from the hour elapsed time type wheel, driving means for operating such subtracting device, and means controlled by the said cam for operatively connecting or disconnecting the driving means and the subtracting device, whereby the subtracting device will be operative to subtract one from the hour elapsed time type wheel only when the minute represented by the position of the minute handle is higher than the minute represented by the position of the minute elapsed time type wheel.

38. The combination of a clock movement, means adapted to be manually operated, and elapsed time indicating mechanism controlled in its indicating operation both by the clock movement and the manually operated means, the former controlling the elapsed time indicating mechanism as to one limit of its indicating operation and the latter controlling it as to the other limit independently of the clock movement.

39. In an elapsed time indicating machine, the combination of elapsed time indicating mechanism for indicating the difference between two operations of the machine, a clock movement for controlling the indicating mechanism in its movement representing the time of the second operation of the machine, and means adapted to be manually operated for controlling the movement of the indicating mechanism representing the time of an earlier operation of the machine independently of the clock movement.

40. The combination of elapsed time indicating mechanism, a clock movement for moving it in one direction to cause it normally to represent the true time, means, manually operated, for moving the indicating mechanism dependent upon the time of an earlier operation of the machine, whereby the elapsed time indicating mechanism will be caused to indicate the elapsed time between two operations of the machine.

41. The combination of elapsed time indicating mechanism, means adapted to be manually operated for controlling such mechanism as to one limit of its elapsed time indicating operation and means for verifying the accuracy of such manual operation.

42. In an elapsed time indicating machine, the combination of elapsed time indicating mechanism, means adapted to be manually operated for controlling such mechanism as to one limit of its elapsed time indicating operation, a support adapted to receive and support a card, printing mechanism for printing the elapsed time upon the card, and means for automatically and intermittently shifting the position of the card support at predetermined times to bring different parts of a card on the card support upon the printing line.

43. The combination of elapsed time indicating mechanism, and means adapted to be manually controlled for controlling such mechanism as to one limit of its elapsed time indicating operation.

In testimony whereof, I have signed my name to this specification, in the presence of two subscribing witnesses.

JAMES W. BRYCE.

Witnesses:
EDWIN SEGER,
GEO. M. HARRIS.

Copies of this patent may be obtained for five cents each, by addressing the "Commissioner of Patents, Washington, D. C."